US010278075B2

(12) United States Patent
Lee et al.

(10) Patent No.: US 10,278,075 B2
(45) Date of Patent: *Apr. 30, 2019

(54) METHOD AND MOBILE TERMINAL FOR CONTROLLING SCREEN LOCK

(71) Applicant: Samsung Electronics Co., Ltd., Suwon-si, Gyeonggi-do (KR)

(72) Inventors: Ju-youn Lee, Seongnam-si (KR); Sang-hyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,087

(22) Filed: Dec. 8, 2016

(65) Prior Publication Data
US 2017/0091437 A1 Mar. 30, 2017
US 2017/0364672 A9 Dec. 21, 2017

Related U.S. Application Data

(63) Continuation of application No. 14/078,170, filed on Nov. 12, 2013, now Pat. No. 9,549,323.

(30) Foreign Application Priority Data

Dec. 3, 2012 (KR) .................. 10-2012-0139249
Mar. 13, 2013 (KR) .................. 10-2013-0026826

(51) Int. Cl.
G06F 21/35 (2013.01)
H04W 12/08 (2009.01)
(Continued)

(52) U.S. Cl.
CPC ........... H04W 12/08 (2013.01); G06F 21/35 (2013.01); H04W 4/20 (2013.01); H04W 4/80 (2018.02);
(Continued)

(58) Field of Classification Search
CPC .............. H04M 2250/22; H04M 1/67; H04M 2250/12; H04W 8/005
(Continued)

(56) References Cited

U.S. PATENT DOCUMENTS 5,821,854 A 10/1998 Dorinski et al.
6,189,105 B1 2/2001 Lopes
(Continued)

FOREIGN PATENT DOCUMENTS

CN 101010652 A 8/2007
CN 101090575 A 12/2007
(Continued)

OTHER PUBLICATIONS

Korean Office Action dated Dec. 21, 2018, issued in a counterpart Korean application No. 10-2013-0026826.

Primary Examiner — Kimberly A Williams
(74) Attorney, Agent, or Firm — Jefferson IP Law, LLP

(57) ABSTRACT

A method of controlling screen lock and a mobile terminal employing the same is provided. The mobile device includes a User Interface (UI) for setting a screen unlock mode using a wireless device other than the mobile terminal and stores IDentifier (ID) information of the wireless device designated by the UI corresponding to the screen unlock mode. The mobile terminal is capable of detecting a wireless device. After the ID information of the wireless device is stored, if the wireless device is detected by the mobile terminal and ID information of the detected wireless device is identical to the stored ID information, the mobile terminal controls not to display an unlock requesting screen when the display unit of the mobile terminal is turned on.

20 Claims, 21 Drawing Sheets

(51) Int. Cl.
*H04W 4/00* (2018.01)
*H04W 88/02* (2009.01)
*G06F 21/32* (2013.01)
*H04W 4/80* (2018.01)
*H04W 4/20* (2018.01)
*H04L 29/06* (2006.01)

(52) U.S. Cl.
CPC .......... *G06F 21/32* (2013.01); *H04L 63/0861* (2013.01); *H04W 88/02* (2013.01)

(58) Field of Classification Search
USPC .................................................. 455/411
See application file for complete search history.

(56) References Cited

U.S. PATENT DOCUMENTS

| | | | |
|---|---|---|---|
| 8,019,322 B2 | 9/2011 | Satou | |
| 8,988,359 B2 | 3/2015 | Nurmi | |
| 9,152,236 B2 | 10/2015 | Kryze et al. | |
| 9,231,660 B1 | 1/2016 | Foster | |
| 2004/0046638 A1 | 3/2004 | Kawasaki | |
| 2005/0225427 A1 | 10/2005 | Bell et al. | |
| 2007/0232270 A1 | 10/2007 | Ohkubo et al. | |
| 2008/0001703 A1 | 1/2008 | Goto | |
| 2008/0020733 A1 | 1/2008 | Wassingbo | |
| 2009/0006846 A1 | 1/2009 | Rosenblatt | |
| 2009/0017871 A1 | 1/2009 | Brieskorn | |
| 2009/0083850 A1 | 3/2009 | Fadell et al. | |
| 2010/0062743 A1 | 3/2010 | Jonsson | |
| 2010/0199323 A1* | 8/2010 | Salyards | G06F 21/31 726/1 |
| 2010/0306718 A1 | 12/2010 | Shim et al. | |
| 2011/0053641 A1 | 3/2011 | Lee et al. | |
| 2011/0117970 A1 | 5/2011 | Choi | |
| 2011/0169654 A1 | 7/2011 | Ketari | |
| 2011/0256848 A1* | 10/2011 | Bok, II | G06F 3/04883 455/411 |
| 2012/0015629 A1 | 1/2012 | Olsen et al. | |
| 2012/0075072 A1 | 3/2012 | Pappu | |
| 2012/0142271 A1 | 6/2012 | Zhodzishsky et al. | |
| 2012/0235790 A1 | 9/2012 | Zhao et al. | |
| 2012/0309314 A1 | 12/2012 | Chen et al. | |
| 2012/0309354 A1 | 12/2012 | Du | |
| 2012/0322370 A1 | 12/2012 | Lee | |
| 2013/0015946 A1 | 1/2013 | Lau et al. | |
| 2013/0094866 A1 | 4/2013 | Pasquero et al. | |
| 2013/0214905 A1 | 8/2013 | Ota et al. | |
| 2013/0298226 A1 | 11/2013 | Fang et al. | |
| 2014/0099991 A1* | 4/2014 | Cheng | G06F 3/017 455/550.1 |
| 2014/0258110 A1* | 9/2014 | Davis | G06Q 20/227 705/41 |

FOREIGN PATENT DOCUMENTS

| | | |
|---|---|---|
| CN | 101681209 A | 3/2010 |
| CN | 102016765 A | 4/2011 |
| EP | 2 518 981 A1 | 10/2012 |
| JP | 2001-245354 A | 9/2001 |
| JP | 2004-102682 A | 4/2004 |
| JP | 2006-060392 A | 3/2006 |
| JP | 2006-109326 A | 4/2006 |
| JP | 2007-233787 A | 9/2007 |
| JP | 2008-053899 A | 3/2008 |
| JP | 2010-035061 A | 2/2010 |
| JP | 2012-208634 A | 10/2012 |
| KR | 10-2007-0014859 A | 2/2007 |
| KR | 10-2010-0077687 A | 7/2010 |
| KR | 10-1121441 A | 3/2012 |
| TW | 201249226 A | 12/2012 |
| WO | 2012/141288 A1 | 10/2012 |
| WO | 2006/019340 A | 12/2012 |

* cited by examiner

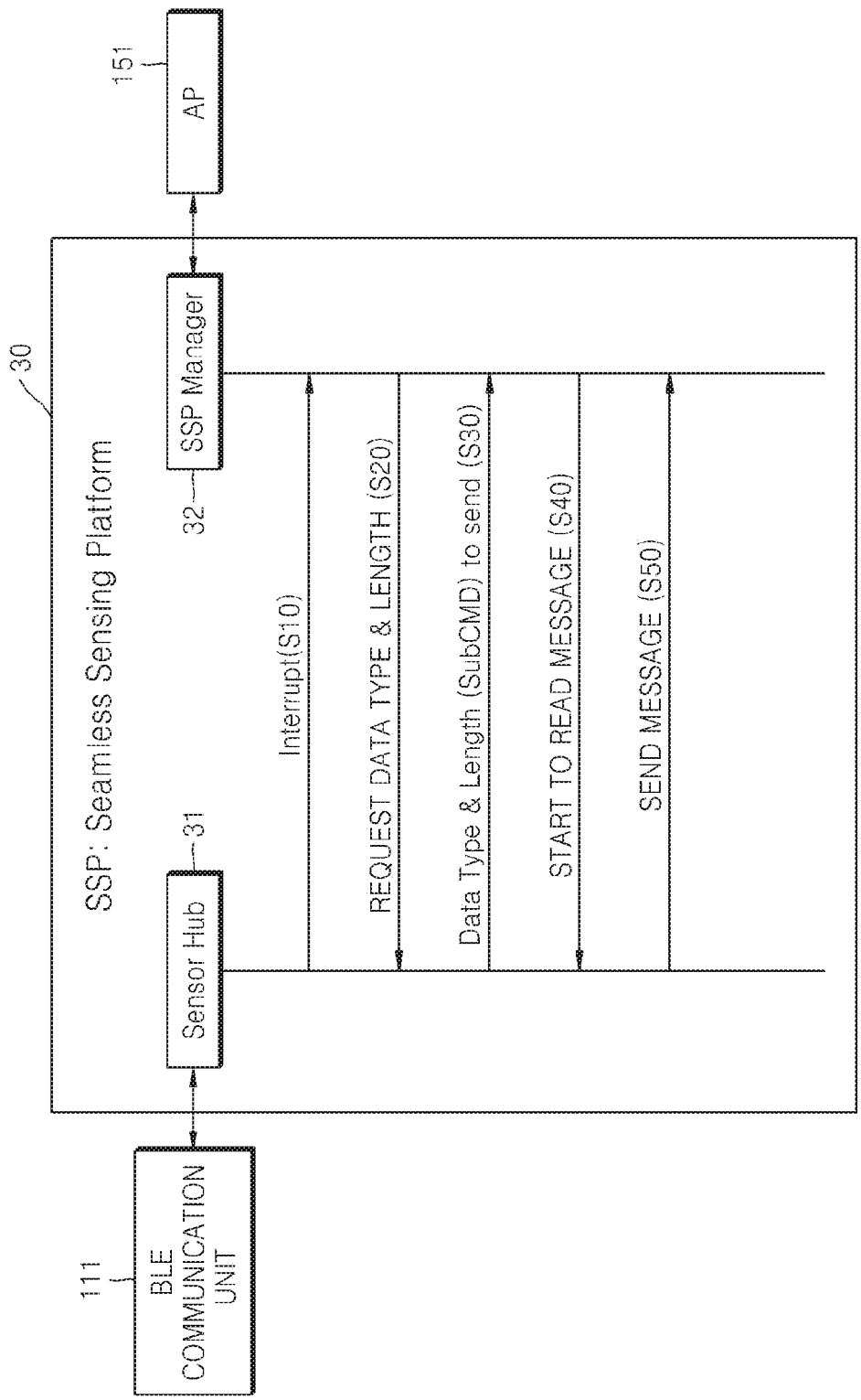

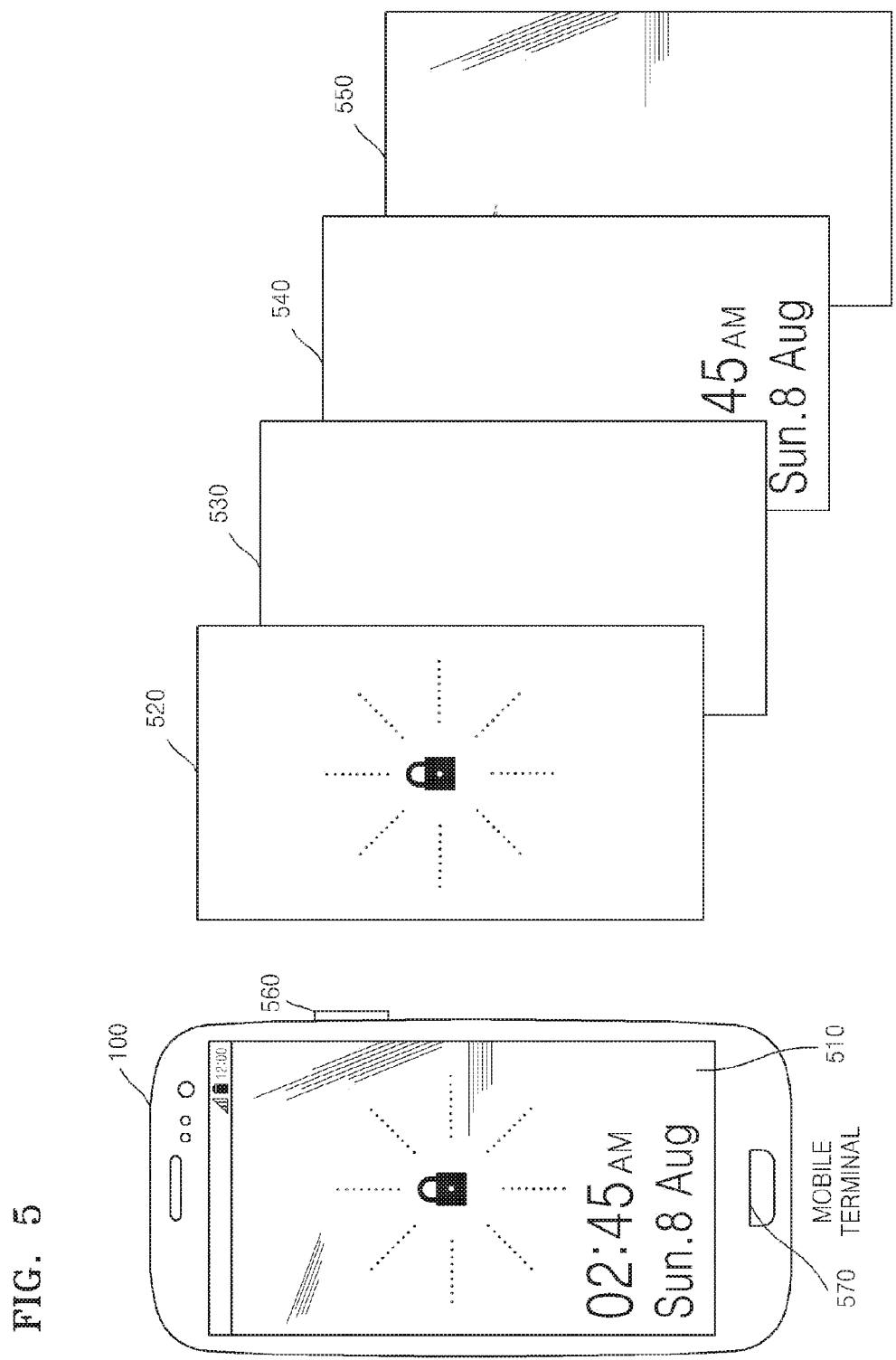

FIG. 19

| Value (1910) | Data Type Name (1920) | Definition (1930) |
|---|---|---|
| 0x01 | «Flags» | (0) LE Limited Discoverable Mode<br>(1) LE General Discoverable Mode<br>(2) BR/EDR Not Supported<br>(3) LE AND BR/EDR SIMULTANEOUS AVAILABILITY (Controller)<br>(4) LE AND BR/EDR SIMULTANEOUS AVAILABILITY (Host) |
| 0x02 | «Incomplete List of 16-bit Service Class UUIDs» | More 16-bit UUIDs available |
| 0x03 | «Complete List of 16-bit Service Class UUIDs» | Complete list of 16-bit UUIDs available |
| 0x04 | «Incomplete List of 32-bit Service Class UUIDs» | More 32-bit UUIDs available |
| 0x05 | «Complete List of 32-bit Service Class UUIDs» | Complete list of 32-bit UUIDs available |
| 0x06 | «Incomplete List of 128-bit Service Class UUIDs» | More 128-bit UUIDs available |
| 0x07 | «Complete List of 128-bit Service Class UUIDs» | Complete list of 128-bit UUIDs available |
| 0x08 | «Shortened Local Name» | |
| 0x09 | «Complete Local Name» | Max 248 bytes, 82 characters |
| 0x0A | «Tx Power Level» | 0xXX:-127 to +27dBm |
| 0x0D | «Class of Device» | Optional OOB Tags |
| 0x0E | «Simple Pairing Hash C» | Optional OOB Tags |
| 0x0F | «Simple Pairing Randomizer R» | Optional OOB Tags |
| 0x10 | «Device ID» | |
| 0x10 | «Security Manager TK Value» | Temporary Key (TK): a 128-bit temporary key used in the pairing process |
| 0x11 | «Security Manager Out of Band Flags» | (0) OOB data not present = 0, present = 1<br>(1) LE supported (Host)<br>(2) LE AND BR/EDR SIMULTANEOUS AVAILABILITY (Host)<br>(3) Address type (0=Public, 1=Random) |
| 0x12 | «Slave Connection Interval Range» | Conn. Interval Min and Conn. Interval Max (range : 0x0006 to 0x0C80, 7.5ms ~ 4s) |
| 0x14 | «List of 16-bit Service Solicitation UUIDs» | REQUEST FOR LIST OF 16 BIT SERVICE UUIDs SERVICE |
| 0x15 | «List of 128-bit Service Solicitation UUIDs» | REQUEST FOR LIST OF 128 BIT SERVICE UUIDs SERVICE |
| 0x16 | «Service Data» | 16 bit Service UUID + Service Data |
| 0x17 | «Public Target Address» | |
| 0x18 | «Random Target Address» | |
| 0x19 | «Appearance» | |
| 0xFF | «Manufacturer Specific Data» | Company ID Code + MSD |

FIG. 20A

| NECESSARY AD TYPE | Byte | PURPOSE | EMBODIMENT |
|---|---|---|---|
| TX Power Level | 1 | MEASURE PREDETERMINED DISTANCE(Signal Strength) pathloss = TX PL − Adv_RSSI | TX Power level = +4 (dBm) RSSI on Adv packet = −60 (dBm) pathloss = +65 dB |
| Shortened Local Name | 29 ↓ | Broadcast Name or Msg | REPLACEMENT TO SCAN RESPONSE IS POSSIBLE ex) GT-N8000, Samsung Mobile |
| Class of Device (Cod) | 3 | Major Device Class Minor Device Class Service Class (24bit bit-mask) | ex) CoD = Major : Phone Minor : Smart phone Service : Object Transfer |
| Random Target Address | 6 | 48-bit address | ex) PREDEFINED ADDRESS SUCH AS SAMSUNG MOBILE, STARBUCKS, ETC. IS USED |
| List of Service Solicitation UUIDs | 2 ↑ | May be sent to invite | ex) 0x1105 <<Object Push Profile>> 0x1106 <<File Transfer Profile>> |
| Manufacturer Specific Data <<Protocol>> | 4 | Company Identifier Code and Protocol Identifier Code | (0x0075) Samsung Electronics (0x0201) SSSP 1.1 |
| Manufacturer Specific Data <<Capability>> | 2 | Capability State (16bit bit-mask) | <<Communication Bitmasks>> (01) Bluetooth BR/EDR (02) Bluetooth AMP (03) Bluetooth LE (04) WiFi (05) WiFi Direct (06) WiFi Display (07) DLNA (All-Share) (08) NFC, RFID (09) ZigBee, RF4CE |

FIG. 20B

| NECESSARY AD TYPE | Byte | PURPOSE | EMBODIMENT |
|---|---|---|---|
| Manufacturer Specific Data `<<Capability>>` | 2 | Capability State (16bit bit-mask) | (10) Ant, Ant+ (11) Proprietary 2.4Ghz (12) Sub-1Ghz (13~16) Reserved ex) 0x00FF (01~08 Supported) |
| Manufacturer Specific Data `<<Sensor>>` | 8 | Sensor ID and Value | `<<Sensor Raw Value>>` (01) GPS (02) Accelerometer (03) Gyroscope (04) Geomagnetic (05) Pressure (06) Temperature (07) Humidty (08) Grip (09) Proximity (10) Light ex) 0x06000024 (Temperature 36°C) |
| Manufacturer Specific Data `<<Others>>` | 2 | Phone State | `<<Phone State Bitmasks>>` (01) Silent mode (02) Screen Rotation (03) Power Saving (04) Notification (05) Mobile Data (06) Driving mode (07) Sync mode (08) Privacy/Flight mode (09~16) Reserved |

METHOD AND MOBILE TERMINAL FOR CONTROLLING SCREEN LOCK

CROSS-REFERENCE TO RELATED PATENT APPLICATION(S)

This application is a continuation application of prior application Ser. No. 14/078,170, filed on Nov. 12, 2013 and claimed the benefit under 35 U.S.C. § 119(a) of a Korean patent application filed on Dec. 3, 2012, in the Korean Intellectual Property Office and assigned Serial No. 10-2012-0139249, and a Korean patent application filed on Mar. 13, 2013 in the Korean Intellectual Property Office and assigned Serial No. 10-2013-0026826, the entire disclosure of each of which is hereby incorporated by reference.

TECHNICAL FIELD

The present disclosure relates to a method of controlling a screen lock and a mobile terminal employing the same. More particularly, the present disclosure relates to a method of controlling a screen of a mobile terminal lock by using the mobile terminal and another wireless device and a mobile terminal employing the method.

BACKGROUND

A User Interface (UI) is a technology for providing temporary or continuous access to enable communication between a user and an object, a system, an apparatus, or a program.

In consideration of an undesired problem of terminal activation, user authentication, and security, a terminal provides a screen lock if predetermined screen lock conditions are satisfied. While a screen lock is being provided, operations of a UI may be partially restricted. While a screen lock is provided, if a call is received, an alarm occurs, or a button is pressed or a touch is received via a partially allowed UI, a terminal displays an unlock requesting screen. After an unlock requesting screen is displayed on a terminal, to display a home screen or to execute and display an application, a predetermined touch gesture, a predetermined key, or a password is received from a user via a partially allowed UI.

For example, a terminal having a touch screen may display a slide-to-unlock screen as an unlock requesting screen to prevent activation of a screen due to an unintended touch. When movement of a touch gesture for moving an image on a slide bar image along a restricted path in a predetermined direction is input on a slide-to-unlock screen, a lock screen disappears.

However, every time a terminal provides a screen lock, a same unlock requesting screen and a user input thereto are presented to unlock the screen lock. Therefore, there is a need for a more user-convenient method of controlling a screen lock of a terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of conveniently controlling a screen lock and a mobile terminal employing the same.

The present disclosure also provides a method of effectively controlling a screen lock by determining a user's intention of using a mobile terminal and a mobile terminal employing the same.

The present disclosure also provides a method of precisely controlling a screen lock by displaying different unlock requesting screens according to environments in which a mobile terminal is being used and a mobile terminal employing the same.

In accordance with an aspect of the present disclosure, a method of controlling screen lock of a mobile terminal is provided. The method includes providing a User Interface (UI) for setting a screen unlock mode using a wireless device other than the mobile terminal, storing IDentifier (ID) information of the wireless device designated by the UI corresponding to the screen unlock mode, and if, after the ID information of the wireless device is stored, the wireless device is detected by the mobile terminal and ID information of the detected wireless device is identical to the stored ID information, controlling not to display an unlock requesting screen when a display unit of the mobile terminal is turned on.

The method further includes, if, after the display unit is turned on, the wireless device having ID information identical to the stored ID information is continuously detected, controlling to keep the display unit on without displaying an unlock requesting screen until a screen off input is received from a user.

The method further includes, if the ID information is not received from the wireless device for a predetermined period of time while the display unit is on, controlling to turn off the display unit.

The wireless device includes a Bluetooth Low Energy (BLE) device.

The method further includes storing a distance between the wireless device and the mobile terminal via the UI, wherein the detection of the wireless device by the mobile terminal indicates that the wireless device is transmitting a signal having an intensity equal to or greater than a reception signal intensity corresponding to the stored distance.

The method further includes storing a sensing condition of the mobile terminal via the UI, and acquiring sensing information, wherein, in the controlling not to display the unlock requesting screen, if, after the ID information of the wireless device is stored, the wireless device is detected by the mobile terminal, ID information of the detected wireless device is identical to the stored ID information, and the acquired sensing information satisfies the sensing condition, the mobile terminal is controlled not to display an unlock requesting screen when the display unit of the mobile terminal is turned on.

The acquiring of the sensing information is carried out if the wireless device is detected by the mobile terminal.

The sensing condition includes a sensing condition that a shape of a grip for holding the mobile terminal is identical to a predetermined grip.

The sensing condition includes a sensing condition that motion of the mobile terminal is identical to a predetermined motion shape.

The sensing condition includes a sensing condition that the face of a user recognized by the mobile terminal corresponds to predetermined face of the user.

The method further includes, after the display unit is turned on, if the ID information is continuously received from the wireless device, acquiring new sensing information from the mobile terminal; and, if the new sensing information satisfies the sensing condition, controlling to keep the display unit on until a screen off input is received from a user of the mobile terminal.

The method further includes storing sensing condition of the wireless device via the UI, and receiving sensing information from the wireless device, wherein, in the controlling not to display the unlock requesting screen, if, after the ID information of the wireless device is stored, the wireless device is detected by the mobile terminal, ID information of the detected wireless device is identical to the stored ID information, and the received sensing information satisfies the sensing condition, the mobile terminal is controlled not to display an unlock requesting screen when the display unit of the mobile terminal is turned on.

In accordance with another aspect of the present and their equivalents, there is provided a mobile terminal which controls screen lock, the mobile terminal including a UI unit, which provides a UI for setting a screen unlock mode using a wireless device other than the mobile terminal, a memory, which stores ID information of the wireless device designated by the UI corresponding to the screen unlock mode, a communication unit, which detects the wireless device, and a control unit, which, if, after the ID information of the wireless device is stored, the wireless device is detected by the mobile terminal and ID information of the detected wireless device is identical to the stored ID information, controls not to display an unlock requesting screen when a display unit of the mobile terminal is turned on.

If, after the display unit is turned on, the wireless device having ID information identical to the stored ID information is continuously detected, the control unit controls to keep the display unit on without displaying an unlock requesting screen until a screen off input is received from a user.

If the ID information is not received from the wireless device for a predetermined period of time while the display unit is on, the control unit controls to turn off the display unit.

The wireless device includes a BLE device.

The memory stores a distance between the wireless device and the mobile terminal via the UI, and the communication unit detects the wireless device transmitting a signal having an intensity equal to or greater than a reception signal intensity corresponding to the stored distance.

The mobile terminal further includes a sensing unit, which acquires sensing information, the memory stores sensing information regarding the mobile terminal via the UI, and, after the ID information of the wireless device is stored, if the wireless device is detected by the mobile terminal, ID information of the detected wireless device is identical to the stored ID information, and the acquired sensing information satisfies the sensing condition, the control unit controls not to display an unlock requesting screen when the display unit of the mobile terminal is turned on.

The sensing unit acquires the sensing information if the wireless device is detected by the mobile terminal.

The sensing condition includes a sensing condition that a shape of a grip for holding the mobile terminal is identical to a predetermined grip.

The sensing condition includes a sensing condition that motion of the mobile terminal is identical to a predetermined motion shape.

The sensing condition includes a sensing condition that the face of a user recognized by the mobile terminal corresponds to predetermined face of the user.

After the display unit is turned on, if the ID information is continuously received from the wireless device, the sensing unit acquires new sensing information from the mobile terminal; and, if the new sensing information satisfies the sensing condition, the control unit controls to keep the display unit on until a screen off input is received from a user of the mobile terminal.

The memory stores sensing condition of the wireless device via the UI, the communication unit receives sensing information from the wireless device, and, after the ID information of the wireless device is stored, if the wireless device is detected by the mobile terminal, ID information of the detected wireless device is identical to the stored ID information, and the received sensing information satisfies the sensing condition, the control unit controls not to display an unlock requesting screen when the display unit of the mobile terminal is turned on.

In accordance with another aspect of the present disclosure, a method of controlling screen lock of a mobile terminal is provided. The method includes storing a predetermined sensing condition and ID information of a wireless device other than the mobile terminal, receiving ID information from the wireless device located by the mobile terminal, acquiring sensing information from the mobile terminal, and, if ID information of the detected wireless device is identical to the stored ID information, and the received sensing information satisfies the sensing condition, controlling not to display an unlock requesting screen when the display unit of the mobile terminal is turned on.

In accordance with another aspect of the present disclosure, a method of controlling screen lock of a mobile terminal is provided. The method includes storing a predetermined sensing condition and ID information of a wireless device other than the mobile terminal, receiving ID information and sensing information from the wireless device located by the mobile terminal, if ID information of the detected wireless device is identical to the stored ID information, and the received sensing information satisfies the sensing condition, controlling not to display an unlock requesting screen when the display unit of the mobile terminal is turned on.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram showing a data communication protocol of a Seamless Sensing Platform (SSP) according to an embodiment of the present disclosure;

FIG. 5 is a diagram showing an unlock requesting screen displayed on a mobile terminal according to an embodiment of the present disclosure;

FIG. 19 is a table for explaining an Advertising Data (AD) type, according to an embodiment of the present disclosure;

FIGS. 20A and 20B are a table for explaining data broadcasted by a BLE device, according to an embodiment of the present disclosure.

Throughout the drawings, it should be noted that like reference numbers are used to depict the same or similar elements, features, and structures.

DETAILED DESCRIPTION

Figure 1:
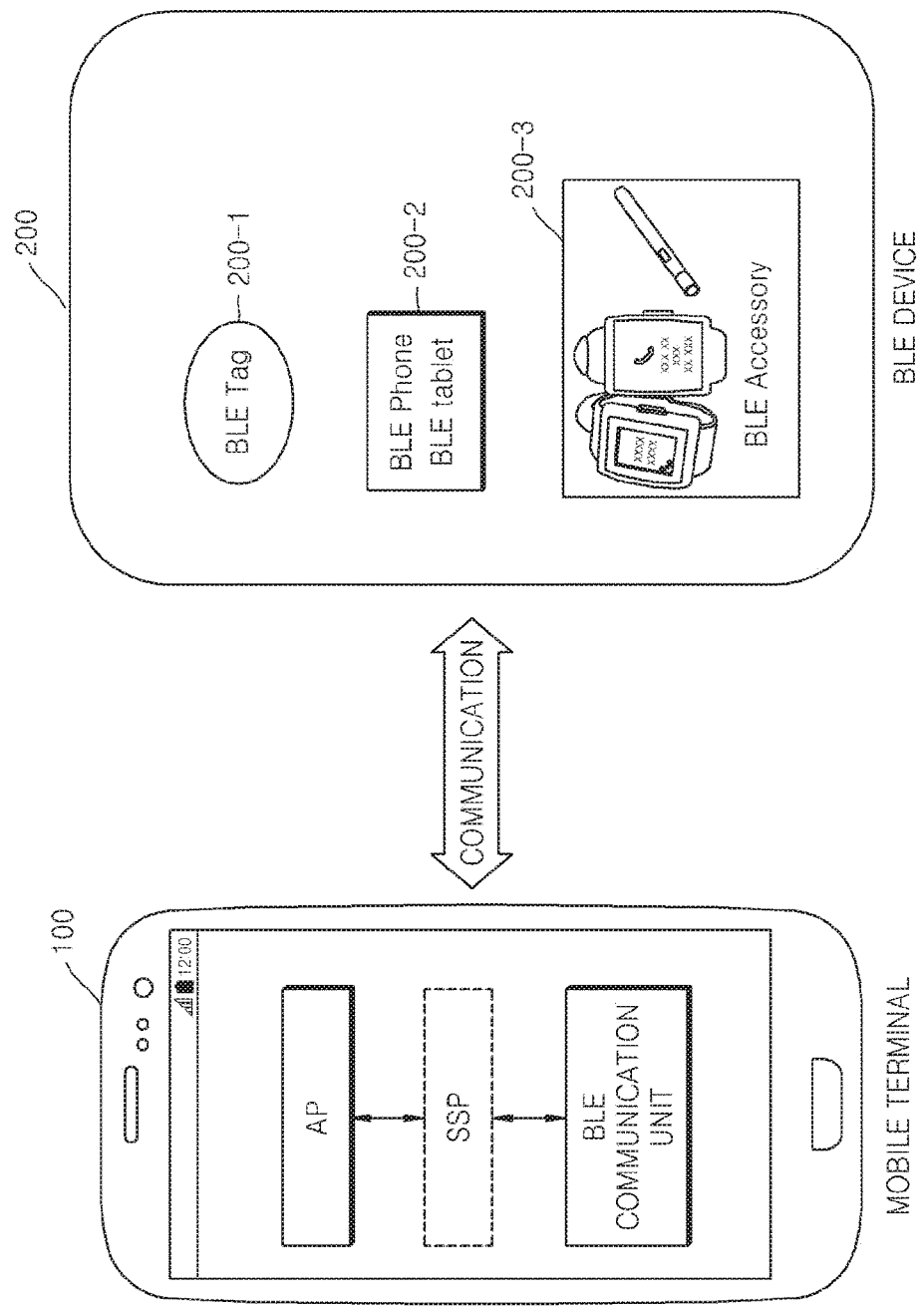
FIG. 1 is a diagram showing a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items.

A mobile terminal according to an embodiment of the present disclosure may be embodied in various forms. For example, examples of the mobile terminals may include a mobile phone, a smart phone, a laptop computer, a tablet Personal Computer (PC), an e-book terminal, a digital broadcasting terminal, a Personal Digital Assistant (PDA), a Portable Multimedia Player (PMP), and a navigation device, but are not limited thereto.

A wireless device according to an embodiment of the present disclosure refers to a wireless communication device existing outside of a mobile terminal or an independent wireless communication device. For convenience of explanation, descriptions below are related to a Bluetooth Low Energy communication (BLE) based device as an example of wireless devices. However, wireless devices according to the present disclosure are not limited thereto. In other words, a wireless device according to the present disclosure may be not only a BLE device, but also various other close-distance communication-based devices, such as a Wi-Fi device, a Zigbee device, a Radio Frequency-IDentification (RF-ID) device, a Near Field Communication (NFC) device, etc. Furthermore, due to its functional feature of transmitting identification information, a wireless device may also be indicated by an IDentifier (ID) tag. Furthermore, a wireless device may be a mobile device capable of not only transmitting identification information or sensing information, but also performing various other functions. Furthermore, a wireless device may be a simple device for periodical one-way transmission of identification information.

The BLE is one of close-distance communication techniques and includes core functions of Bluetooth version 4.0. Compared to the classic Bluetooth, BLE features relatively small duty cycle, low-cost production, and reduced average power consumption and standby power consumption to be able to operate for years with a coin-size battery.

Communication radius at which a mobile terminal is capable of receiving signals from a BLE device is a distance at which the mobile terminal is capable of receiving data (e.g., advertising packet) broadcasted by the BLE device, e.g., from 10 m to 50 m. A predetermined distance between a mobile terminal and a BLE device that is set as a condition for not displaying a unlock requesting screen when a display unit of the mobile device is turned on according to an embodiment of the present disclosure may vary according to actual communication conditions. The predetermined distance may be arbitrarily set by a user. For example, a predetermined area, such as a living room, a kitchen, or the entire house, may be set by a user as a predetermined distance or a predetermined distance (e.g., from 1 m to 2 m) may be set by the user as a predetermined distance. Furthermore, the predetermined distance may indicate intensity of a predetermined signal received from the BLE device by the mobile device.

The present disclosure will now be described more fully with reference to the accompanying drawings, in which various embodiments of the present disclosure are shown. The present disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the description of the present disclosure, if it is determined that a detailed description of commonly-used technologies or structures related to the disclosure may unnecessarily obscure the subject matter of the disclosure, the detailed description will be omitted. Like numbers refer to like elements throughout.

FIG. 1 is a diagram showing a communication system according to an embodiment of the present disclosure.

Referring to FIG. 1, the communication system includes a mobile terminal 100 and a wireless device, such as BLE device 200.

The mobile terminal 100 may be a terminal for providing predetermined services to a user via BLE communications with the external BLE device 200. For example, the mobile terminal 100 may store, register, and manage information regarding the external BLE device 200 (e.g., IDentification (ID) information) in a memory. Furthermore, a BLE communication between the mobile terminal 100 and the BLE device 200 may be two-way communication or a one-way communication in which the BLE device 200 unsolicitedly transmits signals and the mobile terminal 100 receives the signals from the BLE device 200.

Furthermore, in the mobile terminal 100, a Seamless Sensing Platform (SSP) may operate independently from an Application Process (AP). The mobile terminal 100 may collect information of the BLE device 200 and determine a situation without waking up an AP in sleep mode by connecting a BLE communication unit to a sensor hub of the SSP. The SSP wakes up the AP if a predetermined situation occurs. The SSP, the AP, and the BLE communication unit may be embodied as hardware, software, or a combination thereof. Detailed descriptions thereof will be given further below with reference to FIGS. 2 and 3. Alternatively, the mobile terminal 100 may not include a SSP, and a BLE communication unit and an AP may separately be connected and operate.

The BLE device 200 may broadcast ID information to outside via a BLE communication. Here, the BLE device 200 may broadcast ID information in the form of an advertising packet. According to an embodiment of the present disclosure, the BLE device 200 may broadcast information sensed by a sensor to outside. For example, the BLE device 200 may include identification information (for example, "SAMSUNG_Temp_TAG001_blue") in a Universally Unique IDentifier (UUID) field of the advertising packet or in a Manufacturer Specific Data (MSD) field thereof and may broadcast the identification information to the outside. A detailed description of the BLE device 200 broadcasting data in advertising packet form will be provided later with reference to FIGS. 18 to 21. For convenience of explanation, the BLE device 200 including a sensor will be referred to as the sensor-based BLE device.

Furthermore, the BLE device 200 may broadcast ID information of the BLE device 200 or sensing information, at a predetermined cycle or based on an event triggered when sensing information is updated or a particular event occurs.

Furthermore, the BLE device 200 may broadcast ID information in the form of advertising packets and sensing information of the BLE device 200 may be transmitted to the mobile terminal 100 via a communication channel after a pairing of the BLE device 200 with the mobile terminal 100. Here, for security of the sensing information, the BLE device 200 may encrypt the sensing information by using an encryption key negotiated when the BLE device 200 is paired to the mobile terminal 100 or a predetermined encryption key and may transmit encrypted sensing information to the mobile terminal 100.

According to an embodiment of the present disclosure, the BLE device 200 may be embodied in any of various forms. For example, the BLE device 200 may be simply embodied in the form of a BLE tag 200-1, a mobile device 200-2, such as a BLE phone and a BLE tablet PC, or an accessory 200-3, such as a BLE wristwatch or BLE earphones. Configuration of the BLE device 200 will be described further below in additional detail with reference to FIGS. 4A and 4B.

Hereinafter, referring to FIGS. 5 to 8, and 15 to 17, controlling of a screen lock of the mobile terminal 100 by using a wireless device (e.g., the BLE device 200) according to an embodiment of the present disclosure will be described in detail.

Figure 6:
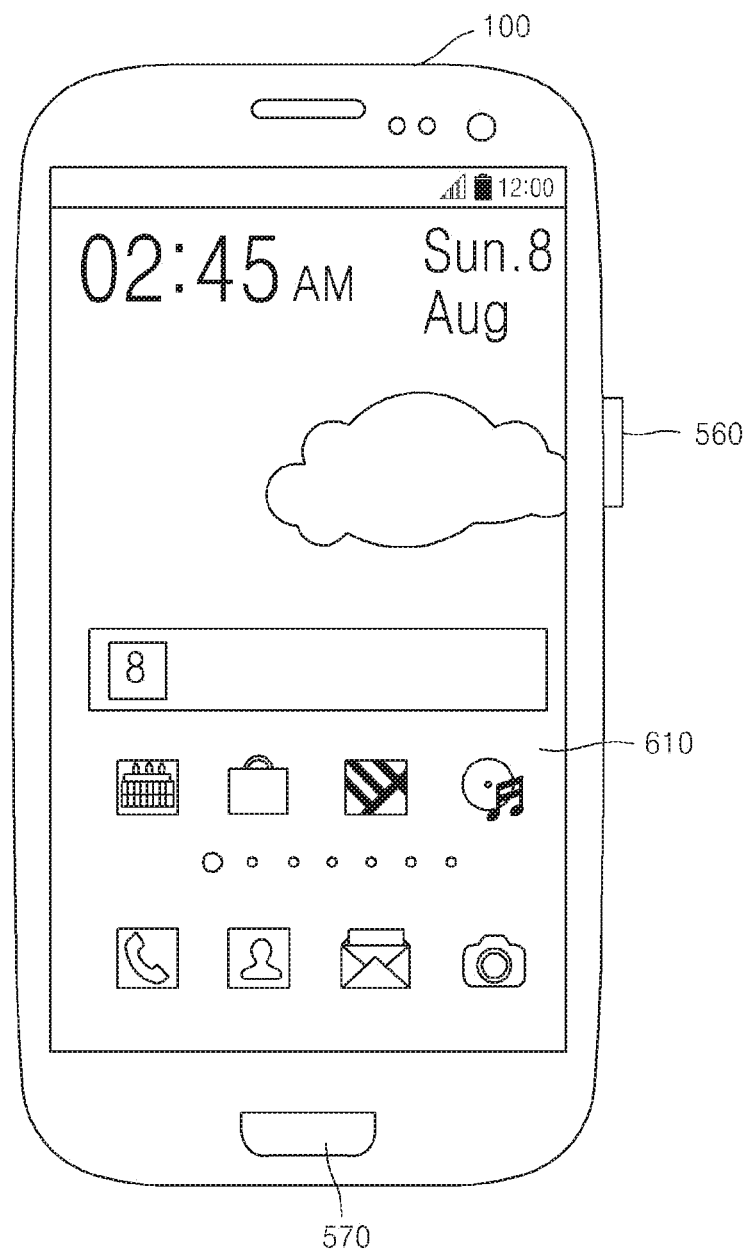
FIG. 6 is a diagram showing a home screen displayed on a mobile terminal according to an embodiment of the present disclosure.
Figure 7:
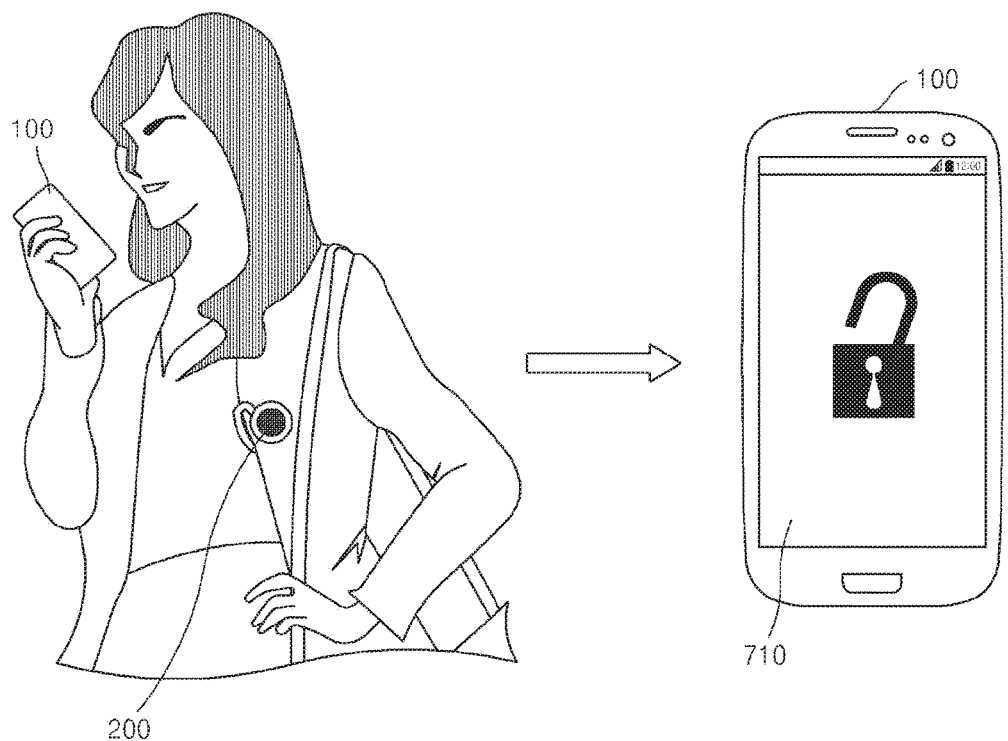
FIG. 7 is a diagram showing a mechanism of controlling a screen lock by using a wireless device according to an embodiment of the present disclosure.
Figure 8:
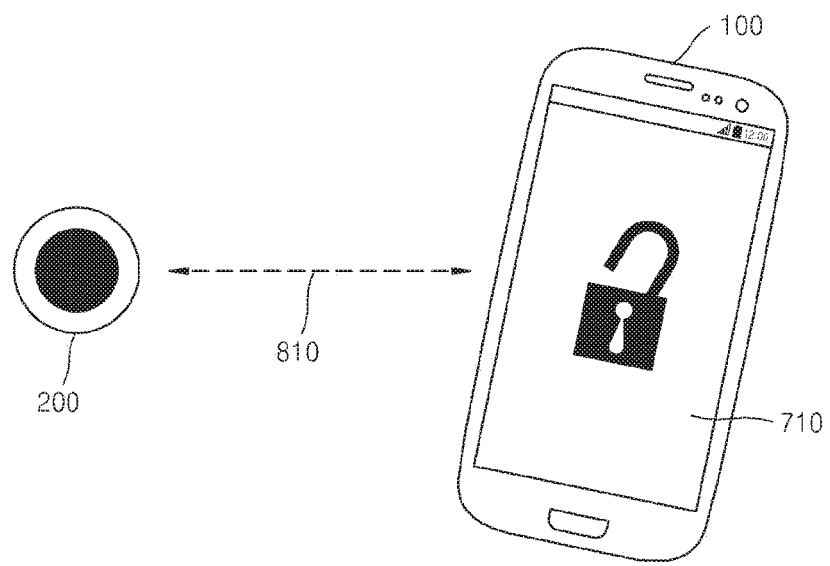
FIG. 8 is a diagram showing a distance between a mobile terminal and a wireless device, according to an embodiment of the present disclosure.
Figure 15:
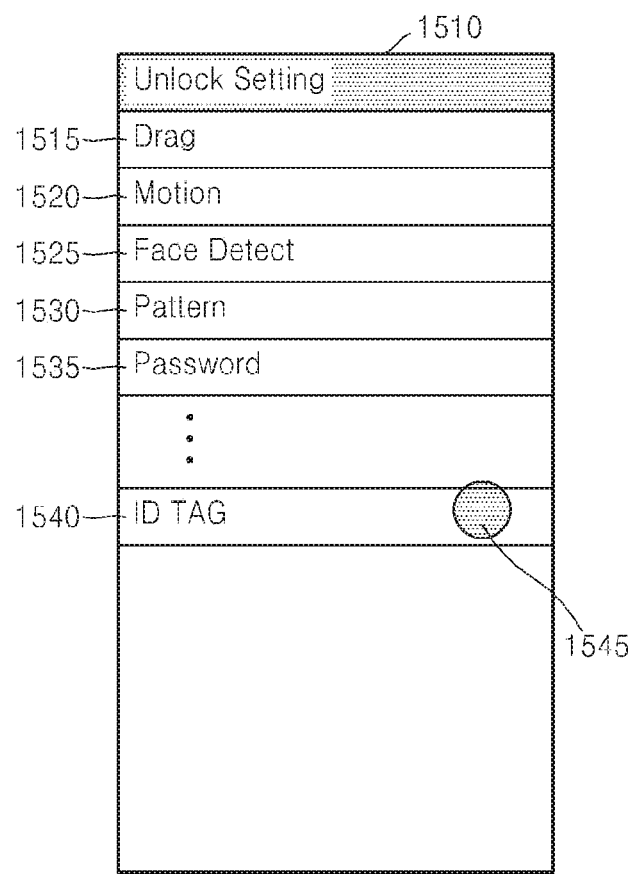
FIG. 15 is a diagram showing a user interface for setting a screen unlock mode according to an embodiment of the present disclosure.
Figure 16:
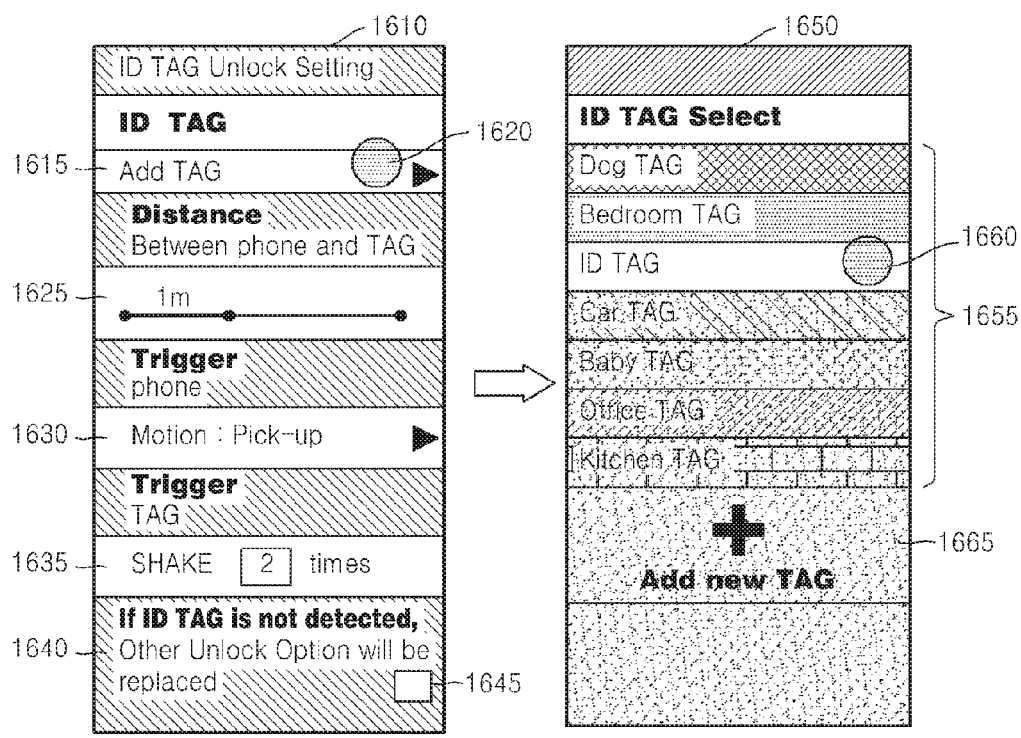
FIG. 16 is another diagram showing a user interface for setting a screen unlock mode according to an embodiment of the present disclosure.
Figure 17:
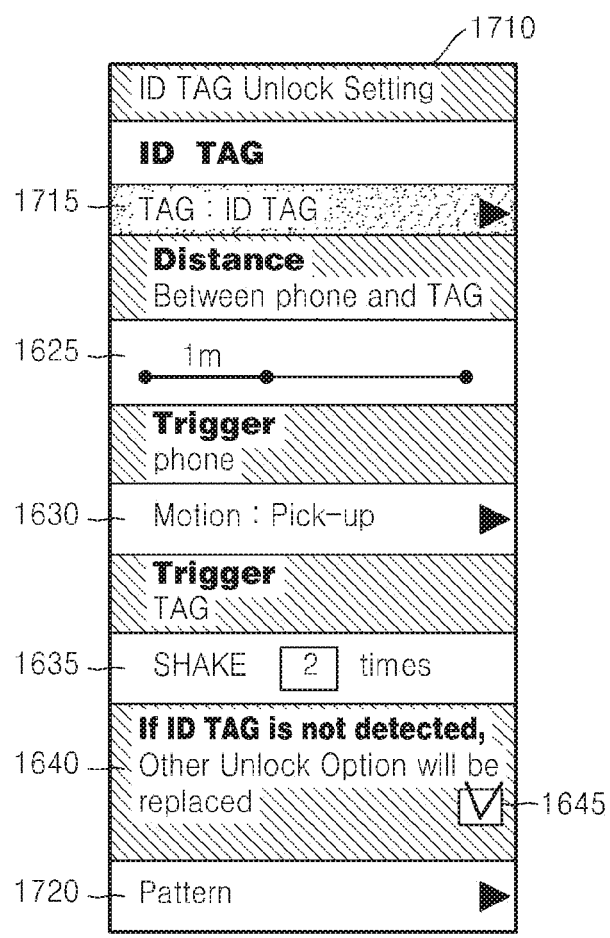
FIG. 17 is another diagram showing a user interface for setting a screen unlock mode according to an embodiment of the present disclosure.

FIG. 5 is a diagram showing an unlock requesting screen displayed on a mobile terminal according to an embodiment of the present disclosure. FIG. 6 is a diagram showing a home screen displayed on a mobile terminal according to an embodiment of the present disclosure. FIG. 7 is a diagram showing a mechanism of controlling a screen lock by using a wireless device according to an embodiment of the present disclosure. FIG. 8 is a diagram showing a distance between a mobile terminal and a wireless device, according to an embodiment of the present disclosure. FIG. 15 is a diagram showing a user interface for setting a screen unlock mode according to an embodiment of the present disclosure. FIG. 16 is another diagram showing a user interface for setting a screen unlock mode according to an embodiment of the present disclosure. FIG. 17 is another diagram showing a user interface for setting a screen unlock mode according to an embodiment of the present disclosure.

The mobile terminal 100 provides User Interfaces (UIs) (e.g., 1510 of FIG. 15, 1610 and 1650 of FIG. 16, and 1710 of FIG. 17) for setting a screen unlock mode (or screen lock mode) to a user. The mobile terminal 100 according to an embodiment of the present disclosure provides a UI for setting a screen unlock (1540 of FIG. 15) of the mobile terminal 100 by using a wireless device to a user. A user may select or set a screen unlock mode to activate via the UI of the mobile terminal 100. For example, screen unlock mode may include not only the screen unlock mode using a wireless device 1540, but also drag to unlock 1515, motion to unlock 1520, face detect to unlock 1525, pattern to unlock 1530, password to unlock 1535, Personal Identification Number (PIN) to unlock (not shown), slide to unlock (not shown), etc.

Furthermore, the mobile terminal 100 may designate ID information of a wireless device corresponding to the screen unlock mode using a wireless device 1540 according to user inputs 1620 and 1660 via UIs (e.g., 1610 and 1650 of FIG. 16) and may store ID information of the designated wireless device in the memory. For example, when a user input 1545 is received via the UI 1510 of FIG. 15, a UI (1610 of FIG. 16 or 1710 of FIG. 17) for setting details of a screen unlock mode using a wireless device may be displayed. Here, an add TAG request 1615 may be made. If there is a wireless device designated by the mobile terminal 100 in advance, the mobile terminal 100 may include a designated wireless device 1715 in the UI 1710. Here, the designated wireless device 1715 may be displayed in the form of ID information, an arbitrary name, or a purpose.

If there is no designated wireless device, a wireless device (or ID information of the wireless device) corresponding to the screen unlock mode using a wireless device 1540 may be designated via the UI 1650. For example, the UI 1650 may display a list of arbitrary names or the purposes 1655 respectively corresponding to ID information of at least one wireless device detected by the mobile terminal 100. An arbitrary name may be allocated to a wireless device based on the user input 1660 or a purpose (e.g., ID TAG) corresponding to the wireless device (or ID information of the wireless device) may be allocated to the wireless device. Here, the ID information is unique information for distinguishing a wireless device from other devices and may include a tag ID, a device name, a serial number, a Media Access Control (MAC) address, etc., for example. The arbitrary name or the purpose 1715 may be arbitrarily designated or named by a user or an application using a corresponding wireless device, such that the mobile terminal 100 distinguishes detected wireless devices from one another. For example, the 'ID TAG' may be designated from among purposes provided by a UI based on a user input in consideration of purposes related to personal information for controlling screen lock or security. Furthermore, for convenience, wireless devices may be distinguished from one another by different colors, patterns, icons, texts, etc. For example, even if different wireless devices detected by the mobile terminal 100 are categorized into a same purpose, the mobile terminal 100 may display wireless devices having different ID information by using different visual effects or texts. Furthermore, if an object 1665 related to functions for adding wireless devices is designated by a user input, the mobile terminal 100 may detect new wireless devices in the surroundings, add a detected wireless device to the list 1655, and display the list 1655.

If a screen unlock mode using a wireless device is set to the mobile terminal 100 or a screen unlock mode is activated, and predetermined conditions are satisfied, the mobile terminal 100 may control not to display a screen unlock requesting screen (e.g., 510 of FIG. 5) when a display unit (e.g., 710 of FIG. 7 or FIG. 8) is turned on. Here, the mobile terminal 100 may control to activate at least a portion of UIs that is restricted to the mobile terminal 100 during the screen lock mode.

Here, a case in which predetermined conditions are satisfied may be a case in which a wireless device is detected within a predetermined distance from the mobile terminal 100 and ID information of the detected wireless device is identical to ID information stored in a memory, as shown in FIG. 7. Furthermore, if predetermined conditions are not satisfied, e.g., if a wireless device is outside a predetermined distance from the mobile terminal 100 or ID information of a detected wireless device is different from ID information stored in a memory, the mobile terminal 100 may control to display the screen unlock requesting screen 510 when a display unit is turned on.

Here, the displayed screen unlock requesting screen 510 may be a first unlock requesting screen corresponding to the screen unlock mode using a wireless device (referred to hereinafter as 'first screen unlock mode'). For example, the first unlock requesting screen may include a guidance message, such as 'no wireless device detected', 'screen cannot be unlocked unless a wireless device is nearby', 'locate a wireless device within a predetermined distance from a mobile terminal'. Furthermore, the first unlock requesting screen may include objects, such as an icon for switching to another screen unlock mode (referred to hereinafter as 'second screen unlock mode'), or a guidance for switching to the second screen unlock mode. Furthermore, when it is switched to the second screen unlock mode according to a user input, an interaction for a screen unlock request corresponding to the second screen unlock mode may be activated. Here, it may be switched to the second screen unlock mode as the predetermined conditions are not satisfied and an interaction for a screen unlock request corresponding to the second screen unlock mode is temporarily activated. In other words, even after an interaction for a screen unlock request corresponding to the second screen unlock mode is activated as predetermined conditions are not satisfied after the first screen unlock mode is activated, the first screen unlock mode, in which it is determined whether to display a screen unlock requesting screen based on whether the predetermine conditions are satisfied, may be active until a user input regarding deactivation of the first screen unlock mode is received.

Furthermore, the screen unlock requesting screen 510 may correspond to the second screen unlock mode (e.g., the drag to unlock 1515, the motion to unlock 1520, the face detect to unlock 1525, the pattern to unlock 1530, the password to unlock 1535, the PIN to unlock, the slide to unlock, etc.). Furthermore, the screen unlock requesting screen 510 may be a screen unlock requesting screen corresponding to a plurality of second screen unlock modes. For example, screen unlock requesting screens corresponding to the pattern to unlock 1530 and the PIN to unlock may be displayed in at least one screen.

Furthermore, the screen unlock requesting screen 510 may be determined according to the second screen unlock mode designated by the mobile terminal 100. The second screen unlock mode may be designated based on a user input via a UI or, if the first screen unlock mode is activated, a predetermined screen unlock mode may be automatically designated as the second screen unlock mode. For example, when a touch input 1545 of a user is received via the UI 1510, the first screen unlock mode 1540 may be designated and a UI (e.g., 1610 of FIG. 16 or 1710 of FIG. 17) for setting details of the first screen unlock mode 1540 may be displayed. The UI for setting details of the first screen unlock mode 1540 may include interaction objects, such as a checkbox 1645, and a guidance 1640 for user interaction regarding the checkbox 1645.

Here, the checkbox 1645 may be an interaction object for receiving selection between the first unlock requesting screen and a screen unlock requesting screen corresponding to the second screen unlock mode (referred to hereinafter as 'second unlock requesting screen') to be displayed on the mobile terminal 100 if either the BLE device 200 is not detected or the predetermined conditions are not satisfied after the first screen unlock mode 1540 is activated. Furthermore, the checkbox 1645 may be an interaction object for receiving an instruction as to whether to switch from the first screen unlock mode 1540 to the second screen unlock mode if either the BLE device 200 is not detected or the predetermined conditions are not satisfied after the first screen unlock mode 1540 is activated. Furthermore, if the checkbox 1645 of the UI 1710 is checked by a user in FIG. 17, the mobile terminal 100 may display the designated second screen unlock mode 1720 in the UI 1710. Here, the displayed second screen unlock mode 1720 may be a mode activated if either the BLE device 200 is not detected or the predetermined conditions are not satisfied after the first screen unlock mode 1540 is activated. Furthermore, the UIs including the checkbox 1645, the guidance 1640, and the second screen unlock mode 1720 may be indicated by or modified to any of various interaction objects, such as radio buttons and lists.

Furthermore, even if the predetermined conditions are satisfied, the mobile terminal 100 may display a third unlock requesting screen corresponding to a third screen unlock mode. The third screen unlock mode may be different from the first screen unlock mode and the second screen unlock mode. Furthermore, if the predetermined conditions are not satisfied, the mobile terminal 100 may display a second unlock requesting screen corresponding to the second screen unlock mode. For example, when the first screen unlock mode is activated and a screen is being turned on, the third screen unlock mode corresponding to the drag to unlock 1515 may be displayed on the display unit of the mobile terminal 100 if the predetermined conditions are satisfied. If the predetermined conditions are not satisfied, a second unlock requesting screen which corresponds to the pattern to unlock 1530 and provides a higher level of security may be displayed on the display unit of the mobile terminal 100. Wherein the level of security for a user input that is provided in the second unlock mode may be higher than the level of security in the third unlock mode. Furthermore, the mobile terminal 100 may provide a UI for also designating the second screen unlock mode or the third screen unlock mode while the first screen unlock mode is being set. As described above, by providing a UI for setting different unlock requesting screens respectively corresponding to environments of using the mobile terminal 100, a more sophisticated screen lock may be provided.

Furthermore, if the predetermined conditions are satisfied, the mobile terminal 100 may automatically turn the display unit on. After the display unit is automatically turned on, the mobile terminal 100 may or may not display a unlock requesting screen.

Furthermore, except when a system event, such as a signal reception and an alarm, occurs at the mobile terminal 100, the display unit may be turned on only when a user input is received via a UI. For example, in FIGS. 5 and 6, the mobile terminal 100 may turn the display unit on when a user input is received via physical buttons, such as a power button 560 and a home key 570.

For example, the screen unlock requesting screen 510 may include a lock image 550, a terminal status displaying layer 540, a transparency control layer 530, and an interaction layer 520 for making an unlock request in the order stated. Once the screen unlock requesting screen 510 is displayed, the screen unlock requesting screen 510 may be continuously displayed until a user input satisfies screen unlock conditions according to the second screen unlock mode (or the third screen unlock mode). For example, if the second screen unlock mode is the drag to unlock 1515, the screen unlock requesting screen 510 may be continuously displayed until a drag gesture corresponding a distance between the starting point and the end point greater than a predetermined distance is input. After the screen unlock requesting screen 510 is displayed, if a user input satisfies screen unlock conditions according to the second screen unlock mode, at least a part of UI restricted by the mobile terminal 100 in the screen lock mode is activated, and a home screen (e.g., 610 of FIG. 6), a executing screen of a predetermined application, or a predetermined image may be displayed on the display unit of the mobile terminal 100.

Furthermore, if the screen unlock requesting screen 510 is not displayed when the display unit is turned on, the interaction layer 520 for making an unlock request may not be displayed. In other words, if at least a part of UI restricted by the mobile terminal 100 in the screen lock mode is activated without any request for a user interaction, a screen including at least one from among the lock image 550, the terminal status displaying layer 540, and the transparency control layer 530 may be displayed without the interaction layer 520 when the display unit is turned on.

Furthermore, from among the predetermined conditions, the detection of a wireless device within a predetermined distance from the mobile terminal 100 may be detection of a wireless device which transmits a signal having an intensity equal to or greater than an intensity of a reception signal corresponding to a predetermined distance. For example, a distance 810 between the mobile terminal 100 and the BLE device 200 in FIG. 8 may be estimated based on intensity of a signal transmitted by the BLE device 200 and received by the mobile terminal 100. The predetermined distance may be designated based on a user input received via a UI (e.g., 1625 of FIG. 16) of the mobile terminal 100. For example, the predetermined distance may be designated by using a slide bar type UI 1625 or a UI for receiving a distance value via buttons or keys. The mobile terminal 100 may store a distance between a wireless device and the mobile terminal 100 designated via a UI and search for a wireless device transmitting a signal having an intensity equal to or greater than an intensity of a reception signal corresponding to the stored distance. Furthermore, the predetermined distance may be a default value (e.g., 2 m) that is stored in the mobile terminal 100 either when the mobile terminal 100 is manufactured or when a command for controlling the first screen unlock mode or screen unlock configuration application is stored in a memory. Furthermore, if the communication range of a wireless device is sufficiently narrow (e.g., from 2 m to 5 m), the predetermined distance may refer to a communication range in which the corresponding wireless device may be detected without any particular setting.

Furthermore, the predetermined distance may also be indicated by a particular intensity of a signal transmitted by the BLE device 200, the intensity measured by the mobile terminal 100. Here, the signal intensity may be indicated as an electric field strength (e.g., v/m or dB unit), Received Signal Strength Indicator (RSSI), Signal to Noise Ratio (SNR), etc. Furthermore, the mobile terminal 100 may provide a UI for designating signal intensity as a predetermined distance.

Furthermore, the predetermined conditions may include not only detection of a wireless device within a predetermined distance from the mobile terminal 100 and agreement between ID information of the detected wireless device and ID information stored in a memory, but also sensing conditions for determining a user's intention of using the mobile terminal 100. The mobile terminal 100 may acquire sensing information regarding the mobile terminal 100 via a sensor of a sensing unit (e.g., 140 of FIG. 2) related to sensing conditions. Furthermore, the mobile terminal 100 may receive sensing information regarding sensing conditions from a wireless device. In this regard, sensing information may be included in a Manufacturer Specific Data (MSD) field of an advertising packet broadcasted from the wireless device. The mobile terminal 100 may determine whether acquired sensing information or received sensing information satisfies the sensing conditions.

Furthermore, the mobile terminal 100 may provide a UI (e.g., 1630 and 1635 of FIG. 16) to designate sensing conditions according to a user input. For example, a sensing condition designated to the UI 1630 may be that motion of the mobile terminal 100 is identical to a predetermined motion (e.g., a pick-up motion). A sensing condition designated to the UI 1635 may be that motion of the BLE device 200 is identical to a predetermined motion (e.g., shake 2 times). Furthermore, a sensing condition may be stored in correspondence to the first screen unlock mode when the mobile terminal 100 is manufactured or may be predetermined in an application including commands for controlling the first screen unlock mode. Detailed descriptions thereof will be given below with reference to FIGS. 2 through 4 and 11 through 14.

Furthermore, if satisfaction of the predetermined conditions continues while the display unit of the mobile terminal 100 is on, the display unit may be continuously on without displaying an unlock requesting screen until a user input for turning the display off is received.

Figure 2:
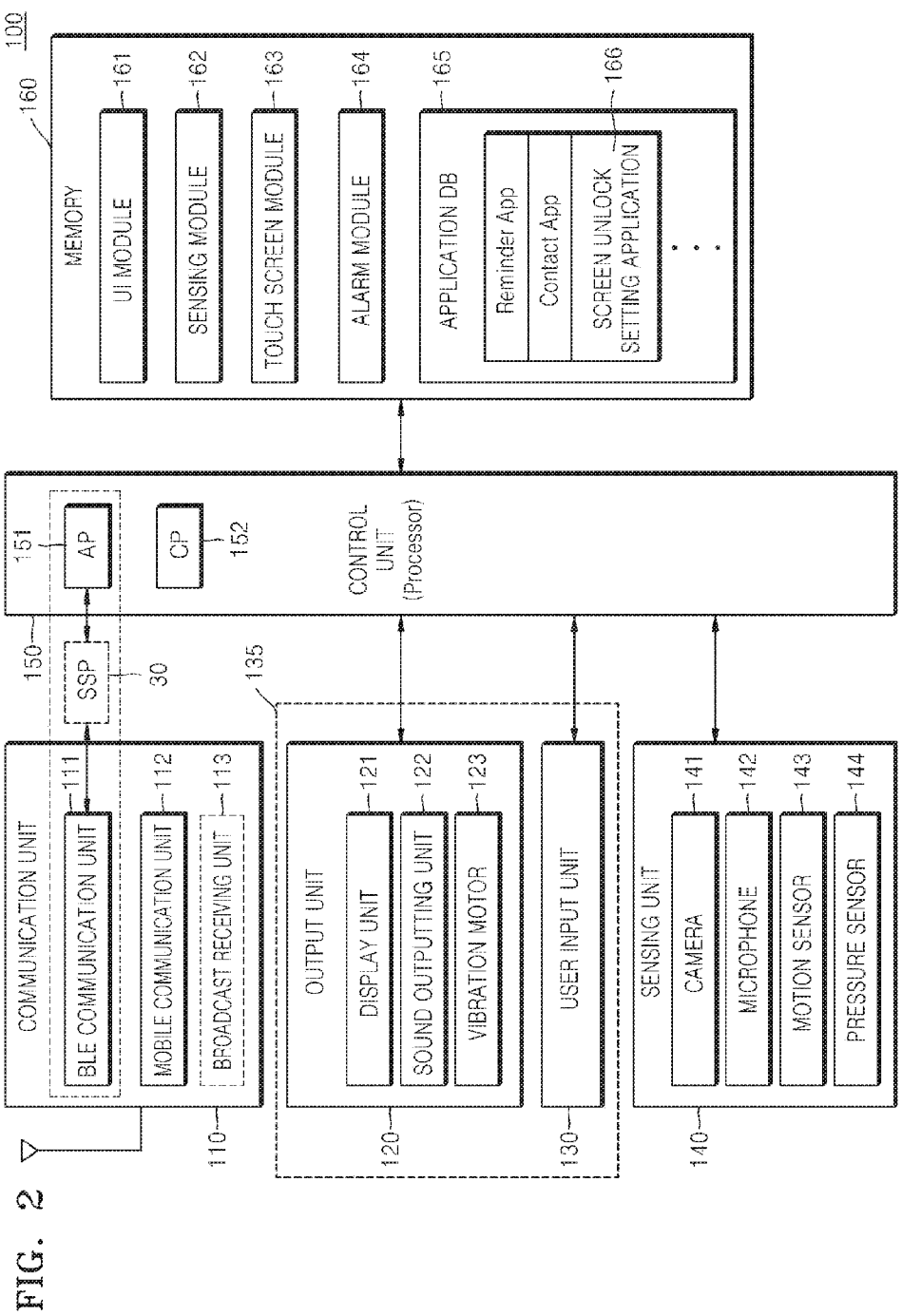
FIG. 2 is a diagram showing a mobile terminal according to an embodiment of the present disclosure.

FIG. 2 is a diagram showing a mobile terminal according to an embodiment of the present disclosure.

Referring to FIG. 2, the mobile terminal 100 includes a communication unit 110, a UI unit 135, a sensing unit 140, a control unit 150, and a memory 160. The UI unit 135 may include an output unit 120 and a user input unit 130.

The communication unit 110 detects a wireless device (e.g., the BLE device 200). The communication unit 110 may measure intensity of a signal received from a wireless device and transmits the measured intensity to the control unit 150. Furthermore, the communication unit 110 receives ID information from a wireless device located within a predetermined distance from the mobile terminal 100. Furthermore, the communication unit 110 may further receive sensing information of the wireless device 200 together with the ID information. In this regard, the communication unit 110 according to an embodiment of the present disclosure may receive the sensing information and the identification information in an advertising data packet. For example, the sensing information may be included in an MSD field of the advertising data packet, and the identification information may be included in a Universally Unique IDentifier (UUID) field or the MSD field thereof.

The communication unit 110 may include one or more components for communication between the mobile terminal 100 and the BLE device 200 or between the mobile terminal 100 and a server. For example, the communication unit 110 may include BLE communication unit 111, mobile communication unit 112, broadcast receiving unit 113, etc.

The BLE communication unit 111 supports BLE communication. For example, the BLE communication unit 111 may receive advertising packets broadcasted by the external BLE device 200. The BLE communication unit 111 may scan (or detect) the BLE device 200 at a predetermined cycle or when a user requests to do so.

The BLE communication unit 111 may be connected to the control unit 150 or a SSP 30. The SSP 30 may include a sensor hub and a SSP manager. The sensor hub is a type of Micro Controller Units (MCU) and may be connected to various types of sensors. The sensor hub may be connected to the BLE communication unit 111 and may collect information regarding the external BLE device 200 via the BLE communication unit 111. The SSP manager may receive data from the sensor hub and may wake up an AP 151 in sleep mode based on the data received from the sensor hub. Detailed descriptions of the SSP 30 will be given further below with reference to FIG. 3.

If the mobile terminal 100 is located within communication range of a BLE device registered in advance in the mobile terminal 100, the BLE communication unit 111 may receive ID information or sensing information from the BLE device 200.

Meanwhile, the communication unit 110 may support close-distance communication functions other than BLE communication. Examples of close-distance communication techniques include Wi-Fi, Bluetooth, Zigbee, Wi-Fi Direct (WFD), Ultra WideBand (UWB), Near Field Communication (NFC), and Infrared Data Association (IrDA). However, the present disclosure is not limited thereto.

The mobile communication unit 112 exchanges wireless signals with at least one from among a station, an external terminal, and a server in a mobile communication network. Here, the wireless signals may include voice call signals, video call signals, or various types of data associated with text/multimedia message transmissions.

The broadcast receiving unit 113 receives broadcasted signals and/or broadcast-related information from outside via a broadcasting channel. The broadcasting channel may include a satellite channel and a ground wave channel. According to embodiments of the present disclosure, the broadcast receiving unit 113 may be omitted.

The UI unit 135 provides a UI for setting the first screen unlock mode using the BLE device 200. Furthermore, via the UI, ID information of the BLE device 200 corresponding to the first screen unlock mode may be designated. Furthermore, the UI unit 135 may provide a UI for setting the second screen unlock mode and the third screen unlock mode described above. Furthermore, the UI unit 135 may receive a predetermined distance between the mobile terminal 100 and the BLE device 200 from a user or may receive sensing conditions.

The UI unit 135 may include the output unit 120 and the user input unit 130. The output unit 120 is a unit for outputting audio signals, video signals, or vibration signals and may include a display unit 121, a sound outputting unit 122, and a vibration motor 123. For example, the display unit 121 may display a UI or Graphic User Interface (GUI) related to phone calls in phone call mode and may display a list of detected BLE devices in a BLE device detecting mode. Here, the display unit 121 may display BLE devices not registered to the mobile terminal 100 and BLE devices registered to the mobile terminal 100 separately.

Furthermore, in a BLE device setting mode, the display unit 121 may display a UI or a GUI related to setting of the BLE device 200.

Meanwhile, if the display unit 121 and a touch pad form a layered structure and are provided as a touch screen unit, the display unit 121 may be used not only as an output device, but also as an input device. The display unit 121 may include at least one from among a Liquid Crystal Display (LCD), a Thin-Film Transistor Liquid Crystal Display (TFT-LCD), an Organic Light Emitting Diode (OLED), a flexible display, a 3 Dimensional (3D) display, and an electrophoretic display. Furthermore, according to structure of the mobile terminal 100, the mobile terminal 100 may include two or more display units 121. Here, the two or more display units 121 may be arranged to face each other via a hinge.

The sound outputting unit 122 outputs audio data received from the communication unit 110 or stored in the memory 160. Furthermore, the sound outputting unit 122 outputs sound signals (e.g., call signal reception sound, message reception sound, etc.) related to functions carried out by the mobile terminal 100. The sound outputting unit 122 may include a speaker and a buzzer.

The vibration motor 123 may output vibration signals. For example, the vibration motor 123 may output vibration signals corresponding to audio data or video data (e.g., call signal reception sound, message reception sound, etc.).

Furthermore, the vibration motor 123 may output vibration signals when a touch is input via a touch screen.

The output unit 120 may output alarm messages predetermined by a user. The output unit 120 may output an alarm message when the mobile terminal 100 is located within communication range of the BLE device 200 or a predetermined distance therefrom or may output an alarm message when the mobile terminal 100 is located outside the communication range of the BLE device 200 or the predetermined distance therefrom. Furthermore, the output unit 120 may output alarm messages according to distances between the BLE device 200 and the mobile terminal 100.

Furthermore, if a difference between sensing information received from a sensor-based BLE device or sensing information acquired by the mobile terminal 100 and predetermined sensing conditions is within a predetermined range, the output unit 120 may output an alarm message.

The output unit 120 may also output at least one from between information regarding a Social Networking Service (SNS) being used by another user possessing the BLE device 200 and information regarding communication history between the BLE device 200 and the mobile terminal 100.

The user input unit 130 refers to a unit with which a user inputs data for controlling the mobile terminal 100. For example, the user input unit 130 may include a button, a keypad, a dome switch, a touch pad (e.g., contact electrostatic capacitive type, pressure resistive film type, infrared detection type, surface acoustic wave propagation type, integral strain gauge type, piezo-effect type, etc.), a jog wheel, a jog switch that are embodied by a software module or a physical mechanism and a circuit. However, the present disclosure is not limited thereto.

The user input unit 130 may designate ID information of a wireless device corresponding to the first screen unlock mode based on a user input made via a UI for setting a screen unlock mode. Furthermore, the user input unit 130 may receive at least one of sensing information regarding the mobile terminal 100 and sensing information regarding a sensor-based BLE device.

The memory 160 stores ID information of the wireless device (e.g., the BLE device 200) corresponding to the first screen unlock mode designated by the UI.

The memory 160 may store programs for processing and controlling the control unit 150 and may also store input/output data (e.g., ID information of a BLE device, attribute information of the BLE device, information added by a user, information sensed by a sensor included in the BLE device, etc.).

The memory 160 may include at least one storage medium from among a flash memory type, a hard disk type, a multimedia card micro type, a card-type memory (e.g., a Secure Digital (SD) memory or a XD memory), a Random Access Memory (RAM), a Static RAM (SRAM), a Read-Only Memory (ROM), an Electrically Erasable/Programmable ROM (EEPROM), a Programmable ROM (PROM), a magnetic memory, a magnetic disk, and optical disc, etc. Furthermore, the mobile terminal 100 may also operate a web storage which functions as the memory 160 on the internet.

Programs stored in the memory 160 may include a plurality of modules according to functions thereof. For example, the programs may include a UI module 161, a touch screen module 163, and an alarm module 164.

The UI module 161 may provide a UI and a GUI coupled with the BLE device 200 according to applications. Since functions of the UI module 161 are obvious to one of ordinary skill in the art based on the name of the component, detailed description thereof will be omitted.

The touch screen module 163 may detect a touch gesture of a user on a touch screen and transmit information regarding the touch gesture to the control unit 150. The touch screen module 163 may also be embodied as a separate controller (i.e., hardware).

Various sensors may be arranged inside or nearby a touch screen to detect a touch on the touch screen or a proximity touch. An example of sensors for detecting a touch on a touch screen may be a tactile sensor. The tactile sensor is a sensor which detects touch of a particular object to the level at the sensitivity of a human or higher sensitivity. The tactile sensor may detect various information, such as roughness of a contacting surface, hardness of a contacting object, a temperature of a contacting point, etc.

Another example of sensors for detecting a touch on a touch screen may be a proximity sensor.

The proximity sensor is a sensor which detects existence of an object approaching to a predetermined detection surface or a nearby object without a mechanical contact by using electromagnetic force or infrared ray. Examples of proximity sensors include a phototransmissive photoelectric sensor, a direct-reflection photoelectric sensor, a mirror-reflection photoelectric sensor, a high-frequency emitting proximity sensor, a capacitive proximity sensor, a magnetic proximity sensor, an infrared proximity sensor, etc. Touch gestures of a user may include tap, touch & hold, double tap, drag, panning, flick, drag and drop, swipe, etc.

The memory 160 may store and maintain a screen unlock setting application 166 for managing and controlling a UI for setting a screen unlock mode using a wireless device. The memory 160 may access the screen unlock setting application 166 in the memory 160 and may load commands for controlling the UI unit 135. Furthermore, the memory 160 may store various applications. For example, an application DataBase (DB) 165 may store a reminder application, a contact application, a map application, a music application, an e-book application, a health management application, a fitness management application, and a baby care application. However, the present disclosure is not limited thereto.

The memory 160 may store ID information of a wireless device (e.g., the BLE device 200) corresponding to a screen unlock mode via a UI. Furthermore, the memory 160 may store a predetermined distance designated via a UI. Furthermore, the memory 160 may map and store ID information of the BLE device 200 and alarm information. Here, the memory 160 may map and store the ID information of the BLE device 200 and a plurality of alarm information.

Furthermore, the memory 160 may include a voice recognition module (not shown) for recognizing voice of a user via a voice recognition engine and transmitting the recognized voice to the control unit 150.

The alarm module 164 may generate a signal for notifying an event occurring at the mobile terminal 100. Examples of events occurring at the mobile terminal 100 may include call signal reception, message reception, key signal input, schedule alarm, etc. The alarm module 164 may output an alarm signal in the form of a video signal via the display unit 121, may output an alarm signal in the form of an audio signal via the sound outputting unit 122, and may output an alarm signal in the form of a vibration signal via the vibration motor 123.

Meanwhile, the alarm module 164 may provide snooze function. For example, if a user sets an alarm repetition limit (e.g., 5 times) or an alarm repetition interval (e.g., 3 minutes), the alarm module 164 may output alarm signals for a predetermined number of times (e.g., 5 times) or at a predetermined interval (e.g., 3 minutes).

When a wireless device (e.g., the BLE device 200) is detected within a predetermined distance from the mobile terminal 100 and ID information of the wireless device is identical to ID information stored in the memory 160, the control unit 150 controls not to display an unlock requesting screen when the display unit of the mobile terminal 100 is turned on.

Furthermore, the control unit 150 controls the overall operations of the mobile terminal 100. The control unit 150 may control the overall operations of the communication unit 110, the output unit 120, the UI unit 135, and the memory 160 by executing programs stored in the memory 160.

The control unit 150 may include an application processor 151 and a communication processor 152. The application processor 151 may control executions of various applications stored in the memory 160. For example, if ID information of the BLE device 200 is received, the application processor 151 may extract and execute an application for executing a control command corresponding to the ID information. For example, if ID information of the BLE device 200 is identical to ID information stored in the memory 160, the application processor 151 may load and execute the screen unlock setting application 166 for executing control commands corresponding to a screen unlock mode using a wireless device. The communication processor 152 may control various communication functions.

Furthermore, the control unit 150 may map and register attribute information regarding the BLE device 200 to information added by a user and manage the registered information. Furthermore, the control unit 150 may extract a BLE device not registered to the mobile terminal 100 from among detected BLE devices by comparing ID information of the detected BLE devices and a list of registered BLE devices stored in the memory 160. The control unit 150 may generate a list of BLE devices that are not registered to the mobile terminal 100. The control unit 150 may photograph an object (e.g., the BLE device 200 itself or an object/location to which the 200 is attached/installed) by using a camera 141 based on a user input.

Furthermore, the control unit 150 may acquire information regarding a distance between the BLE device 200 and the mobile terminal 100 by using intensity of a signal received from the 200. For example, the control unit 150 may calculate a distance between the BLE device 200 and the mobile terminal 100 by using information regarding a correlation between intensity of a received signal and a distance.

Furthermore, the control unit 150 may extract predetermined alarm information corresponding to ID information of the BLE device 200. The control unit 150 may extract alarm information corresponding to ID information of the BLE device 200 based on ID information of the BLE device 200 and a time point at which the ID information of the BLE device 200 is received. Here, the alarm information may include at least one of an alarm message and an alarm condition that are input by a user. The control unit 150 may extract alarm information from the memory 160 or may receive alarm information from an external server.

The control unit 150 may determine whether a BLE device corresponding to received ID information is a registered BLE device by comparing the ID information of the BLE device 200 and information regarding registered BLE devices stored in the memory 160.

According to another embodiment of the present disclosure, the memory 160 may store at least one sensing condition designated via a UI (e.g. 1630 of FIG. 16 or FIG. 17) or a predetermined sensing condition of the mobile terminal 100. Furthermore, the mobile terminal 100 may further include a sensing unit 140 which acquires sensing information. When the BLE device 200 is detected within a predetermined distance from the mobile terminal 100, ID information of the BLE device 200 is identical to ID information stored in the memory 160, and acquired sensing information satisfies sensing conditions, the control unit 150 controls not to display an unlock requesting screen when the display unit of the mobile terminal 100 is turned on. Here, the sensing unit 140 may acquire sensing information if the BLE device 200 is detected within a predetermined distance from the mobile terminal 100. Furthermore, the memory 160 may store or maintain a sensing module 162 that is a group of commands for the control unit 150 to control the sensing unit 140.

The sensing unit 140 may include a camera 141, a motion sensor 143, and a pressure sensor 144. A sensing condition may be that a shape of a grip for holding the mobile terminal 100 is identical to a predetermined grip. The pressure sensor 144 may acquire sensing information regarding a user's grip for holding the mobile terminal 100. The shape of the grip for holding the mobile terminal 100 may be information regarding locations of a hand or fingers contacting the mobile terminal 100 and pressure applied to the mobile terminal 100 by the hand or the fingers. The control unit 150 may determine whether sensing information regarding the detected shape of the grip satisfies a predetermined grip or whether sensing information regarding the detected shape of the grip is similar enough to the predetermined grip, thereby estimating whether a user has an intention of using the mobile terminal 100.

Furthermore, a sensing condition may be that motion of the mobile terminal 100 is identical to a predetermined motion shape. The motion sensor 143 may detect motion of the mobile terminal 100 and acquire sensing information regarding the motion shape. The motion sensor 143 may include an acceleration sensor, a geomagnetic sensor, a gyro sensor, etc. The motion sensor 143 may detect directions and magnitudes of motion of the mobile terminal 100 for a predetermined period of time and acquire motion shape information, such as a trace of the motion or accumulated data of motion vectors. Based on the acquired sensing information, the control unit 150 may determine whether the motion shape of the mobile terminal 100 satisfies a predetermined motion shape or the motion shape of the mobile terminal 100 is similar enough to the predetermined motion shape, thereby estimating whether a user has an intention of using the mobile terminal 100. For example, the predetermined motion shape may be a motion that a user lifts up the mobile terminal 100 or a motion that the mobile terminal 100 is tilted to an angle within a predetermined range for a predetermined period of time.

Furthermore, a sensing condition may be that the face of a user recognized by the mobile terminal 100 corresponds to the predetermined face of the user. The camera 141 may acquire sensing information regarding a face image by photographing the face of a user of the mobile terminal 100. The camera 141 may include a 2 Dimensional (2D) or 3D optical sensor and a 3D depth sensor. The camera 141 may be arranged at a surface of the mobile terminal 100 including the display unit 121. Furthermore, a sensing condition may be that the face of a user or eyes of the user face toward the mobile terminal 100. Therefore, the sensed condition may be used to determine whether a user has an intention of using the mobile terminal 100. Furthermore, the camera 141 may acquire an image frame, such as a still image or a moving image, via an image sensor in a video call mode or a photographing mode. An image captured via an image sensor may be processed by the control unit 150 or a separate image processing unit (not shown). The processed image frame may be displayed on the display unit 121, stored in the memory 160, or transmitted to outside via the communication unit 110. According to aspects of the configuration of the mobile terminal 100, the two or more cameras 141 may be arranged.

Furthermore, to control not to display an unlock requesting screen when the display unit of the mobile terminal 100 is turned on, the sensing conditions as described above may be selectively designated. In other words, one from among the sensing conditions may be designated and applied or at least two of the sensing conditions may be applied in combination. Therefore, it would be obvious to one of ordinary skill in the art that the sensing unit 140 may have various sensor configurations for acquiring sensing information to be compared to sensing conditions.

Furthermore, the sensing unit 140 may further include a microphone 142 for inputting audio signals. The microphone 142 receives external sound signals and processes the received sound signals to electric voice data in a phone call mode, a recording mode, or a voice recognition mode. Here, if the processed voice data may be converted into a form to be transmitted to a mobile communication station and output via the mobile communication unit 112.

According to another embodiment of the present disclosure, the memory 160 may store a sensing condition regarding the BLE device 200 designated via a UI (e.g., 1635 of FIG. 16 or FIG. 17) or a predetermined sensing condition. Furthermore, the communication unit 110 may receive sensing information from the BLE device 200. Furthermore, if the BLE device 200 is detected within a predetermined distance from the mobile terminal 100, ID information of the BLE device 200 is identical to ID information stored in the memory 160, and acquired sensing information satisfies sensing conditions, the control unit 150 may control not to display an unlock requesting screen when the display unit of the mobile terminal 100 is turned on. Here, the BLE device 200 may transmit not only ID information, but also sensing information to the mobile terminal 100. Furthermore, the mobile terminal 100 may further include a SSP to collect and manage sensing information received from the BLE device 200. Although sensing conditions are already described above, descriptions thereof will be given again further below with reference to FIGS. 13 and 14.

FIG. 3 is a diagram showing a data communication protocol of a SSP according to an embodiment of the present disclosure.

Referring to FIG. 3, the SSP 30 may include a sensor hub 31 and a SSP manager 32. Here, the BLE communication unit 111 may be attached to the sensor hub 31, whereas the SSP manager 32 may be included in the framework of the application processor 151.

Therefore, the sensor hub 31 may receive ID information (e.g., tag ID, device name, etc.) of the BLE device 200 broadcasted by the external BLE device 200 and values sensed by the BLE device 200 via the BLE communication unit 111. Here, if it is necessary to wake up the application processor 151 in sleep mode (e.g., when it is necessary to execute a predetermined application in relation to received ID information of the BLE device 200), the sensor hub 31 may transmit an Interrupt signal to notify that there is data to be transmitted to the SSP manager 32 at operation S10.

The SSP manager 32 may transmit a signal requesting data type and length of data to be transmitted by the sensor hub 31 to the sensor hub 31 at operation S20. In this case, the sensor hub 31 may transmit information regarding data type and length of data to be transmitted to the SSP manager 32 at operation S30. The SSP manager 32 may transmit a start to read message to the sensor hub 31 at operation S40, and, when the start to read message is received, the sensor hub 31 may process BLE signal intensity data, for example, to a predetermined packet and transmit the packet to the SSP manager 32 at operation S50.

Figure 4A:
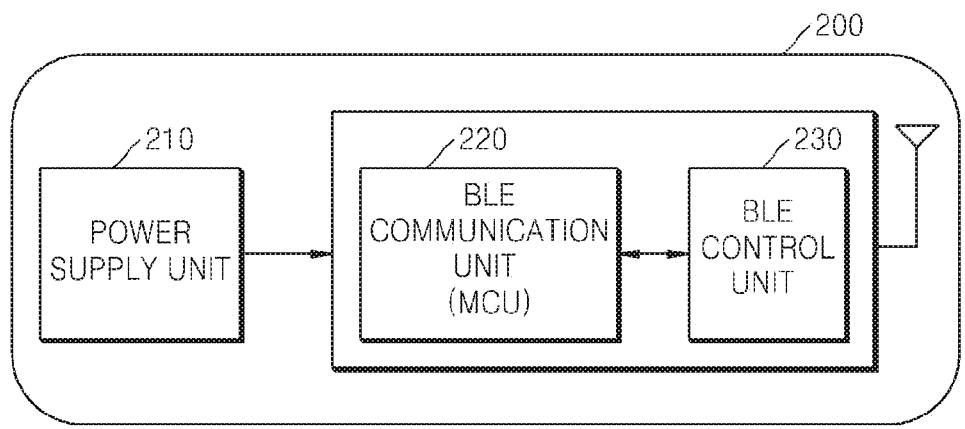
FIGS. 4A and 4B are diagrams showing a wireless device according to an embodiment of the present disclosure.
Figure 4B:
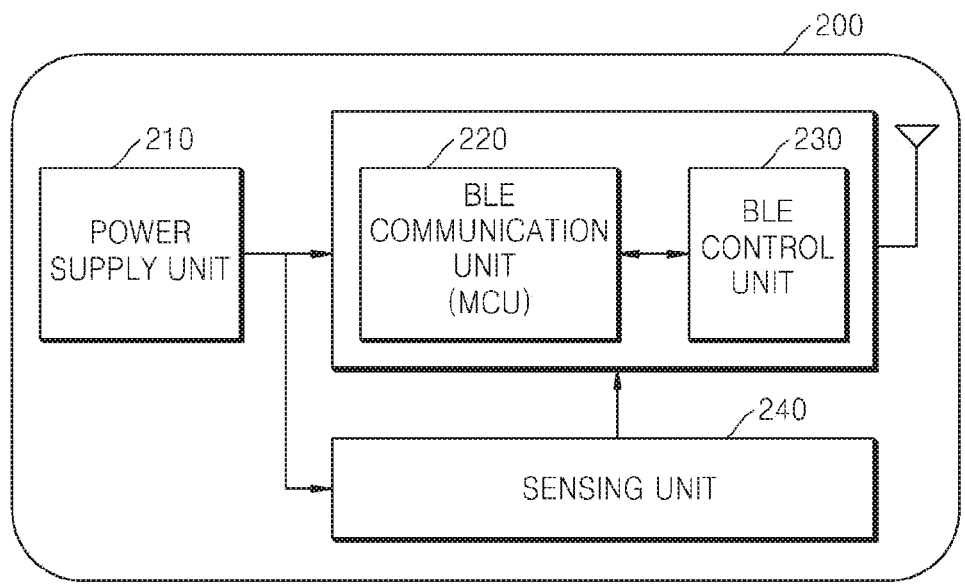

FIGS. 4a and 4B are a diagram showing a wireless device according to an embodiment of the present disclosure.

Referring to FIG. 4A, the BLE device 200 may include a power supply unit 210, a BLE communication unit 220, and a control unit 230.

The power supply unit 210 is to supply power to the BLE device 200 and may be a battery, for example. The power supply unit 210 may be recharged or replaced.

The BLE communication unit 220 may control to broadcast ID information of the BLE device 200 to outside at a predetermined interval (e.g., 1 second). Here, the control unit 230 may transmit ID information of the BLE device 200 stored in a memory to the mobile terminal 100 via the BLE communication unit 220. ID information of the BLE device 200 is unique information to distinguish the BLE device 200 from other devices and may include a tag ID, a device name, a serial number, a MAC address, etc.

Furthermore, referring to FIG. 4B, the BLE device 200 may further include a sensing unit 240.

The sensing unit 240 may sense status of the BLE device 200 or status of an object to which the BLE device 200 is attached and may transmit sensing information to the control unit 230.

The sensing unit 240 may include at least one from among a temperature sensor, a humidity sensor, a weight sensor, an acceleration sensor, a tilt sensor, a gyro sensor, a 3-axis magnetic sensor, a pressure sensor, a luminance sensor, a touch sensor, and a proximity sensor. Furthermore, it would be obvious to one of ordinary skill in the art that the sensing unit 240 may also include any of various sensors other than the sensors stated above.

Meanwhile, if the BLE device 200 further includes the sensing unit 240, the control unit 230 may broadcast sensing information at a predetermined interval (e.g., 1 second) via the BLE communication unit 220. The predetermined interval may vary.

Figure 9:
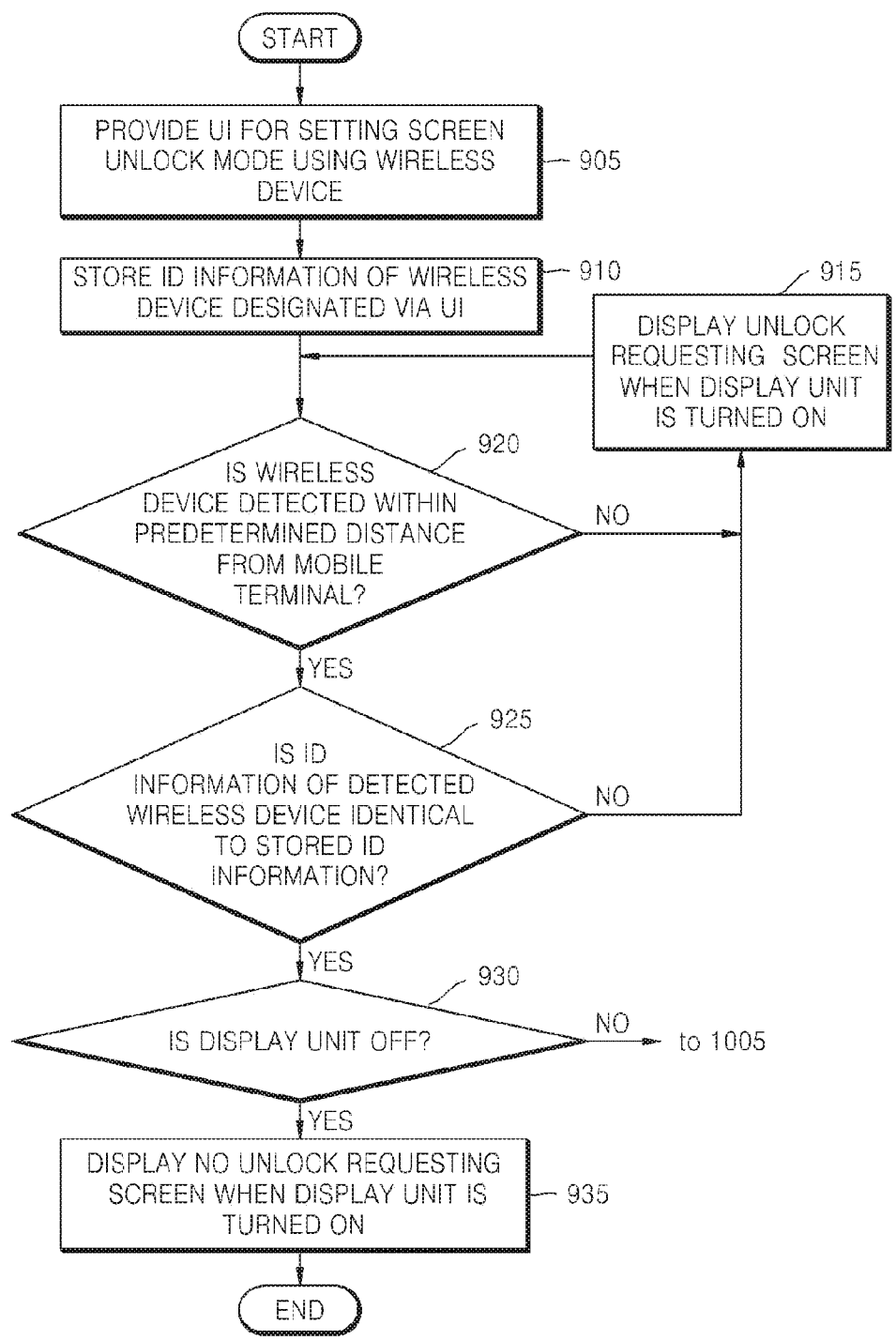
FIG. 9 is a flowchart showing a method of controlling a screen lock according to an embodiment of the present disclosure.
Figure 10:
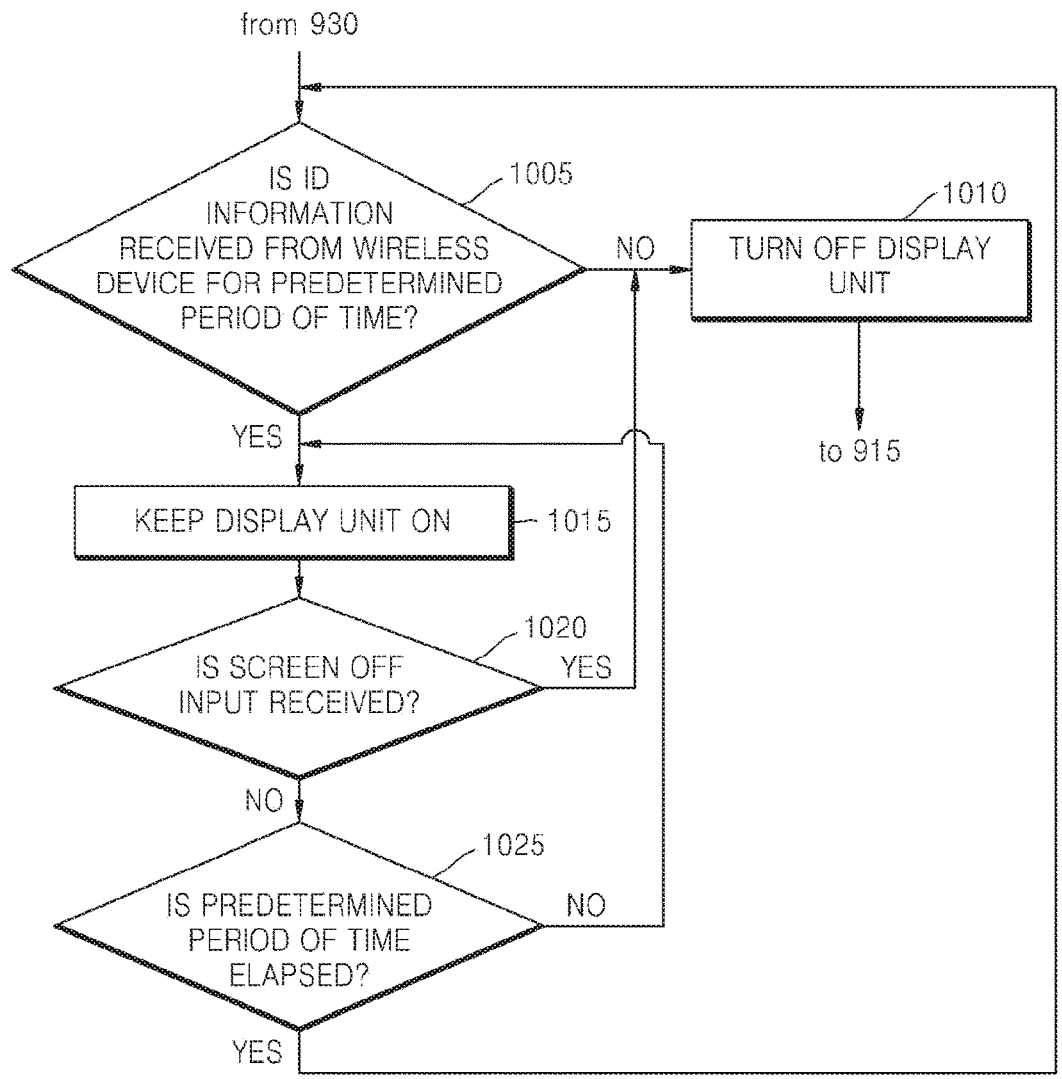
FIG. 10 is another flowchart showing a method of controlling a screen lock according to an embodiment of the present disclosure.

FIGS. 9 and 10 are flowcharts showing a method of controlling screen lock at the mobile terminal 100, according to an embodiment of the present disclosure.

Referring to FIGS. 9 and 10, in operation 905, the mobile terminal 100 may provide a UI for setting a screen unlock mode using a wireless device (e.g., the BLE device 200) other than the mobile terminal 100.

In operation 910, the mobile terminal 100 may store ID information of a wireless device corresponding to a screen unlock mode designated via the UI. Furthermore, the mobile terminal 100 may store a distance between the wireless device designated via the UI and the mobile terminal 100.

In operation 920, the mobile terminal 100 may determine whether a wireless device is detected within a predetermined distance from the mobile terminal 100. Here, detection of a wireless device within a predetermined distance from the mobile terminal 100 may indicate detection of a wireless device transmitting a signal having an intensity equal to or greater than an intensity corresponding to a predetermined distance or a stored distance. Furthermore, if intensity of a signal from a wireless device is sufficiently small, a separate setup regarding a predetermined distance between a wireless device and the mobile terminal 100 may be omitted. In this case, operation 920 may be for determining whether a wireless device is detected, and more particularly, whether the mobile terminal 100 is capable of receiving a signal from a wireless device and acquiring ID information therefrom. Therefore, the predetermined distance may not be a particular value regarding limits of a distance between the wireless device and the mobile terminal 100 or signal intensities, but be a communication radius in which a wireless device may be detected. If no wireless device is detected within a predetermined distance from the mobile terminal 100 in operation 910, the mobile terminal 100 may display a unlock requesting screen when the display unit of the mobile terminal 100 is turned on in operation 915. Thereafter the process returns to step 920.

If a wireless device is detected within a predetermined distance from the mobile terminal 100, the mobile terminal 100 may determine whether ID information of the detected wireless device is identical to stored ID information in operation 925. If ID information of the detected wireless device is not identical to the stored ID information, the mobile terminal 100 may perform operation 915.

If ID information of the detected wireless device is identical to the stored ID information and the display unit of the mobile terminal 100 is off in operation 930, the mobile terminal 100 may control not to display an unlock requesting screen when the display unit of the mobile terminal 100 is turned on in operation 935.

If ID information of the detected wireless device is identical to the stored ID information and the display unit of the mobile terminal 100 is on, the mobile terminal 100 may perform operation 1005 of FIG. 10.

Referring to FIG. 10, in connection with the method of controlling screen lock, a method of controlling screen status using a wireless device while the display unit of the mobile terminal 100 is on will be described below.

While the display unit of the mobile terminal 100 is on, if a wireless device having ID information identical to stored ID information is continuously detected within a predetermined distance from the mobile terminal 100, the control unit 150 of the mobile terminal 100 may control to keep the display unit of the mobile terminal 100 on without displaying an unlock requesting screen until a screen off input is received from a user. Furthermore, if no ID information is received from a wireless device for a predetermined period of time while the display unit of the mobile terminal 100 is on, the control unit 150 may control the display unit of the mobile terminal 100 to be turned off.

In operation 1005, the mobile terminal 100 may determine whether ID information identical to stored ID information is received from a wireless device located within a predetermined distance from the mobile terminal 100 for a predetermined period of time. Here, operation 1005 may indicate operation 920 and operation 925.

In operation 1005, if no wireless device is detected within a predetermined distance from the mobile terminal 100 or ID information of a detected wireless device is not identical to stored ID information, the mobile terminal 100 may turn the display unit off in operation 1010. After operation 1010, the mobile terminal 100 may perform operation 915 of FIG. 9.

In operation 1005, if a wireless device is detected within a predetermined distance from the mobile terminal 100 and ID information of the detected wireless device is identical to stored ID information, the mobile terminal 100 may control to keep the display unit on in operation 1015.

In operation 1020, the mobile terminal 100 may determine whether a screen off input is received via the UI unit 135. The screen off input may be a user input received via a power button 560 in FIG. 6, for example. If a screen off input is received, the mobile terminal 100 may perform operation 1010 and turn the display unit off.

If no screen off input is received, the mobile terminal 100 may determine whether a predetermined period of time is elapsed in operation 1025. If the predetermined period of time is not elapsed, the mobile terminal 100 may control to keep the display unit on in operation 1015. If the predetermined period of time is elapsed, the mobile terminal 100 may perform operation 1005 again.

Figure 11:
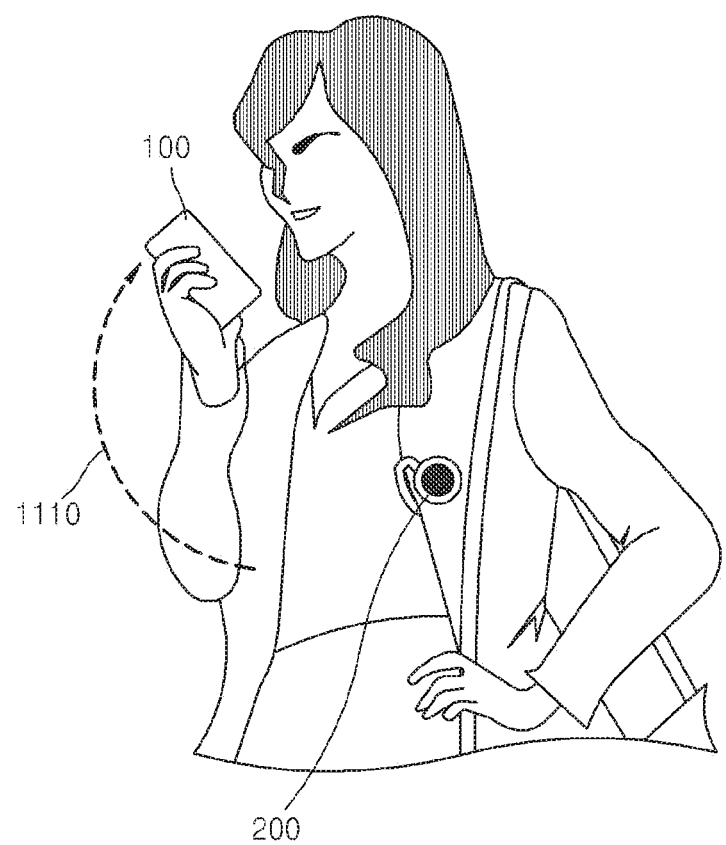
FIG. 11 is a diagram showing a mechanism of controlling a screen lock by using a wireless device according to another embodiment of the present disclosure.
Figure 12:
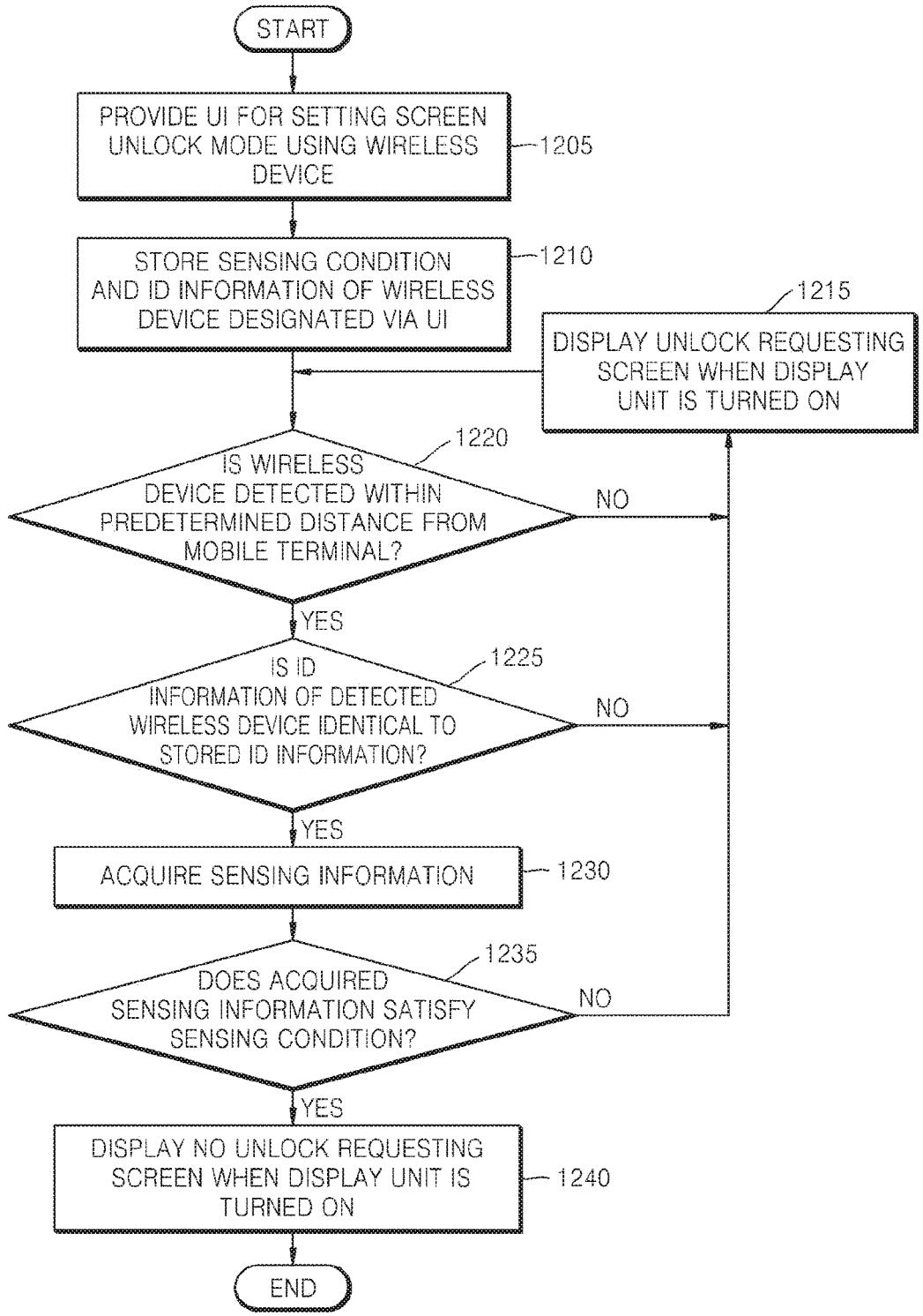
FIG. 12 is a flowchart showing a method of controlling a screen lock according to another embodiment of the present disclosure.

FIG. 11 is a diagram showing a mechanism of controlling a screen lock by using a wireless device according to another embodiment of the present disclosure. FIG. 12 is a flowchart showing a method of controlling a screen lock according to another embodiment of the present disclosure.

Referring to FIGS. 11 and 12, the mobile terminal 100 may provide a UI for setting a screen unlock mode using a wireless device (e.g., the BLE device 200). The mobile terminal 100 may store at least one sensing condition designated via a UI (e.g., 1630 of FIG. 16 or FIG. 17) or a predetermined sensing condition of the mobile terminal 100. The sensing unit 140 may acquire sensing information related to the stored sensing condition. For example, the sensing condition may be that motion of the mobile terminal 100 is identical to a predetermined motion shape. For example, the predetermined motion shape may be a 'pick-up motion' designated via a UI (1630 of FIG. 16 or FIG. 17). Referring to FIG. 11, the mobile terminal 100 may detect motion 1110 of the mobile terminal 100, thereby acquiring sensing information regarding motion shape. Therefore, the mobile terminal 100 may determine whether acquired sensing information satisfies a sensing condition by determining whether the motion 1110 of the mobile terminal 100 is identical to the pick-up motion.

In operation 1205 of FIG. 12, the mobile terminal 100 may provide a UI for setting a screen unlock mode using a wireless device (e.g., the BLE device 200).

In operation 1210, the mobile terminal 100 may store a sensing condition designated via a UI and ID information of the wireless device.

In operation 1220, the mobile terminal 100 may determine whether a wireless device is detected within a predetermined distance from the mobile terminal 100. Here, the predetermined distance may not be a particular value regarding limits of a distance between the wireless device and the mobile terminal 100 or signal intensities, but be a communication radius in which a wireless device may be detected. If no wireless device is detected within a predetermined distance from the mobile terminal 100, the mobile terminal 100 may control to display an unlock requesting screen when the display unit of the mobile terminal 100 is turned on in operation 1215.

If a wireless device is detected within a predetermined distance from the mobile terminal 100, the mobile terminal 100 may determine whether ID information of the detected wireless device is identical to stored ID information in operation 1225. If ID information of the detected wireless device is not identical to stored ID information, the mobile terminal 100 may perform operation 1215.

If ID information of the detected wireless device is identical to stored ID information, the mobile terminal 100 may acquire sensing information regarding the mobile terminal 100 in operation 1230. Furthermore, operation 1230 may be performed regardless of condition satisfactions in operations 1220 and 1225 or a sequence of the process. For example, operation 1230 may be performed when a wireless device having ID information identical to stored ID information is detected regardless of a distance thereto or may be performed at a predetermined interval if the display unit of the mobile terminal 100 is turned off.

In operation 1235, the mobile terminal 100 may determine whether acquired sensing information satisfies a sensing condition. If the acquired sensing information fails to satisfy the sensing condition, the mobile terminal 100 may perform operation 1215.

If the acquired sensing information satisfies the sensing condition, the mobile terminal 100 may control not to display an unlock requesting screen when the display unit of the mobile terminal 100 is turned on in operation 1240.

Furthermore, the mobile terminal 100 may control screens status by using sensing information regarding a wireless device and the mobile terminal 100 while the display unit of the mobile terminal 100 is on. For example, while the display unit of the mobile terminal 100 is on, if a wireless device having ID information identical to stored ID information is continuously detected within a predetermined distance from the mobile terminal 100 and acquired sensing information satisfies a sensing condition, the control unit 150 of the mobile terminal 100 may control to keep the display unit of the mobile terminal 100 on without displaying an unlock requesting screen until a screen off input is received from a user. Furthermore, if no ID information is received from a wireless device for a predetermined period of time while the display unit of the mobile terminal 100 is on or acquired sensing information fails to satisfy a sensing condition, the control unit 150 may control the display unit of the mobile terminal 100 to be turned off.

Figure 13:
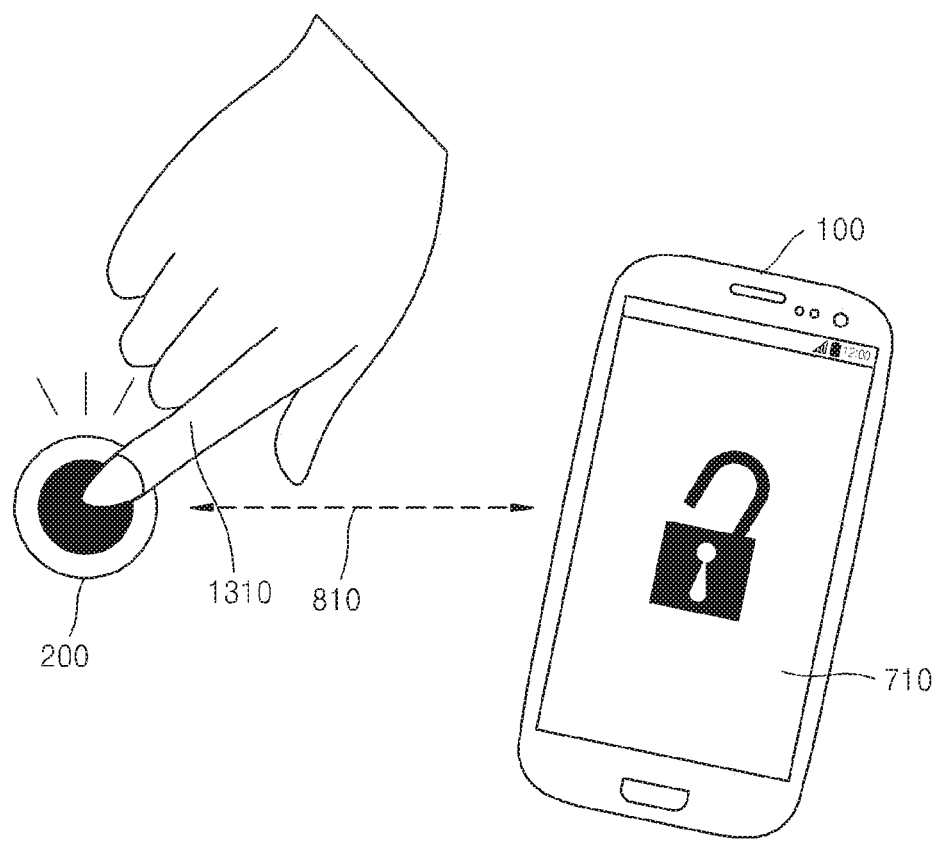
FIG. 13 is a diagram showing a mechanism of controlling a screen lock by using a wireless device according to another embodiment of the present disclosure.
Figure 14:
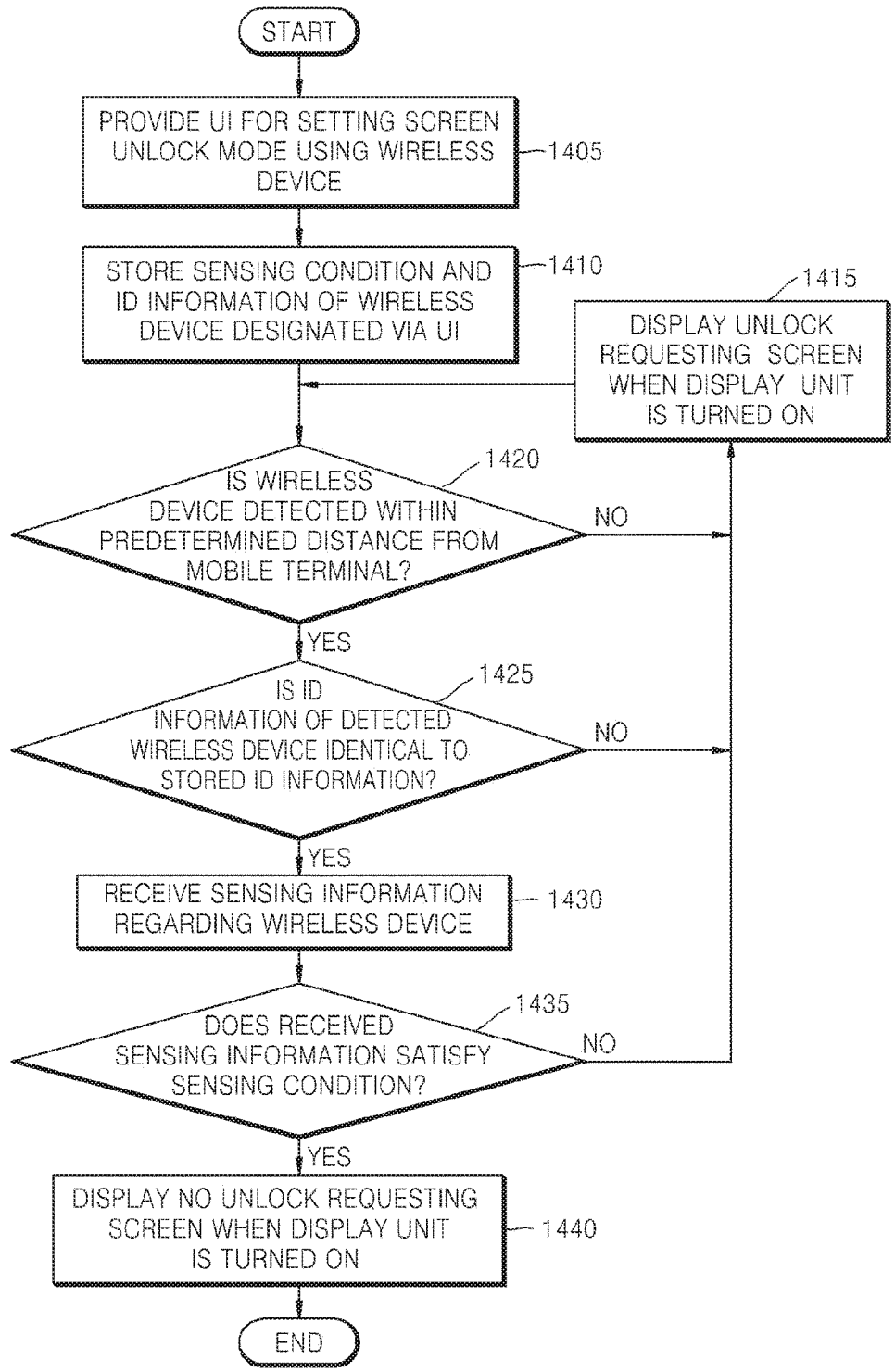
FIG. 14 is a flowchart showing a method of controlling a screen lock according to another embodiment of the present disclosure.

FIG. 13 is a diagram showing a mechanism of controlling a screen lock by using a wireless device according to another embodiment of the present disclosure. FIG. 14 is a flowchart showing a method of controlling a screen lock according to another embodiment of the present disclosure.

Referring to FIGS. 13 and 14, the mobile terminal 100 may provide a UI for setting a screen unlock mode using a wireless device (e.g., the BLE device 200). The mobile terminal 100 may store at least one sensing condition designated via a UI (e.g., 1635 of FIG. 16 or FIG. 17) or a predetermined sensing condition of the mobile terminal 100. The mobile terminal 100 may receive sensing information related to a stored sensing condition from the wireless device. In this regard, the mobile terminal 100 according to an embodiment of the present disclosure may receive sensing information included in the MSD field of an advertising packet from the wireless device. For example, the sensing condition may be that motion of the mobile terminal 100 is identical to a predetermined motion shape. For example, the predetermined motion shape may be a 'shake 2 times' designated via a UI (1635 of FIG. 16 or FIG. 17). Furthermore, a sensing condition may indicate a touch gesture of touching the wireless device. For example, the touch gesture may be a 'two-tap touch' indicating that the wireless device is touched by 2 successive times within a predetermined period of time based on a user input. In FIG. 13, the sensing unit 240 of the BLE device 200 may sense a user input 1310 regarding the BLE device 200, thereby acquiring sensing information. Here, the sensing unit 240 may include a touch sensor, a pressure sensor, or a motion sensor. The BLE device 200 may broadcast the acquired sensing information or transmit the acquired sensing information to the mobile terminal 100. For example, the BLE device 200 may include the sensing information in the MSD field of an advertising data packet and broadcast the sensing information. The mobile terminal 100 may determine whether the received sensing information satisfies sensing conditions.

In operation 1405, the mobile terminal 100 may provide a UI for setting a screen unlock mode using a wireless device (e.g., the BLE device 200).

In operation 1410, the mobile terminal 100 may store at least one sensing condition designated via a UI (e.g., 1630 of FIG. 16 or FIG. 17) or a predetermined sensing condition of the mobile terminal 100.

In operation 1420, the mobile terminal 100 may determine whether a wireless device is detected within a predetermined distance from the mobile terminal 100. Here, the predetermined distance may not be a particular value regarding limits of a distance between the wireless device and the mobile terminal 100 or signal intensities, but be a communication radius in which a wireless device may be detected. If no wireless device is detected within a predetermined distance from the mobile terminal 100, the mobile terminal 100 may control to display an unlock requesting screen when the display unit of the mobile terminal 100 is turned on in operation 1415.

If a wireless device is detected within a predetermined distance, the mobile terminal 100 may check whether ID information of the detected wireless device is identical to stored ID information in operation 1425. If the ID information of the detected wireless device is not identical to the stored ID information, the mobile terminal 100 may perform operation 1415.

If the ID information of the detected wireless device is identical to the stored ID information, the mobile terminal 100 may receive sensing information of the wireless device from the wireless device in operation 1430. Here, the sensing information of the wireless device may be transmitted by the wireless device together with the ID information of the wireless device or separately from the ID information of the wireless device. Also, the sensing information of the wireless device may be broadcasted after being included in the MSD field of the advertising packet.

In operation 1435, the mobile terminal 100 may determine whether the received sensing information satisfies sensing conditions. If the received sensing information fails to satisfy sensing conditions, the mobile terminal 100 may perform operation 1415.

If the received sensing information satisfies sensing conditions, the mobile terminal 100 may not display an unlock requesting screen when a display unit is switched OFF status to ON status in operation 1440.

Furthermore, the mobile terminal 100 may control screen status by using ID information and sensing information of a wireless device while the display unit of the mobile terminal 100 is on. For example, if a wireless device having ID information identical to stored ID information is continuously detected within a predetermined distance from the mobile terminal 100 and acquired sensing information satisfies a sensing condition, the control unit 150 of the mobile terminal 100 may control to keep the display unit of the mobile terminal 100 on without displaying an unlock requesting screen until a screen off input is received from a user. Furthermore, if no ID information is received from a wireless device for a predetermined period of time while the display unit of the mobile terminal 100 is on or acquired sensing information fails to satisfy a sensing condition, the control unit 150 may control the display unit of the mobile terminal 100 to be turned off.

Furthermore, the mobile terminal 100 may control screen lock by using ID information of a wireless device, sensing information regarding the mobile terminal 100, and sensing information regarding the wireless device together. For example, the mobile terminal 100 may set and store a sensing condition regarding the mobile terminal 100 and a sensing condition regarding a wireless device via a UI (1630 and 1635 of FIG. 16 or FIG. 17). If a wireless device having ID information identical to stored ID information is detected within a predetermined distance from the mobile terminal 100 and the sensing condition of the mobile terminal 100 and the sensing condition of the wireless device are satisfied, the mobile terminal 100 may control not to display an unlock requesting screen when the display unit of the mobile terminal 100 is turned on. As described above, the embodiments given above may be combined with one another or may partially be modified.

Furthermore, one of ordinary skill in the art will understand that programs related to the embodiments described above with reference to FIGS. 9, 10, 12, and 14 may be embodied as software, hardware, or a combination thereof. Programs related to the embodiments described above with reference to FIGS. 9, 10, 12, and 14 may be recorded on a non-transitory recording medium or may be downloaded to a mobile terminal from a server or a computer via a communication network.

A data format of the advertising packet broadcasted by the BLE device 200 will now be described in more detail below.

Figure 18:
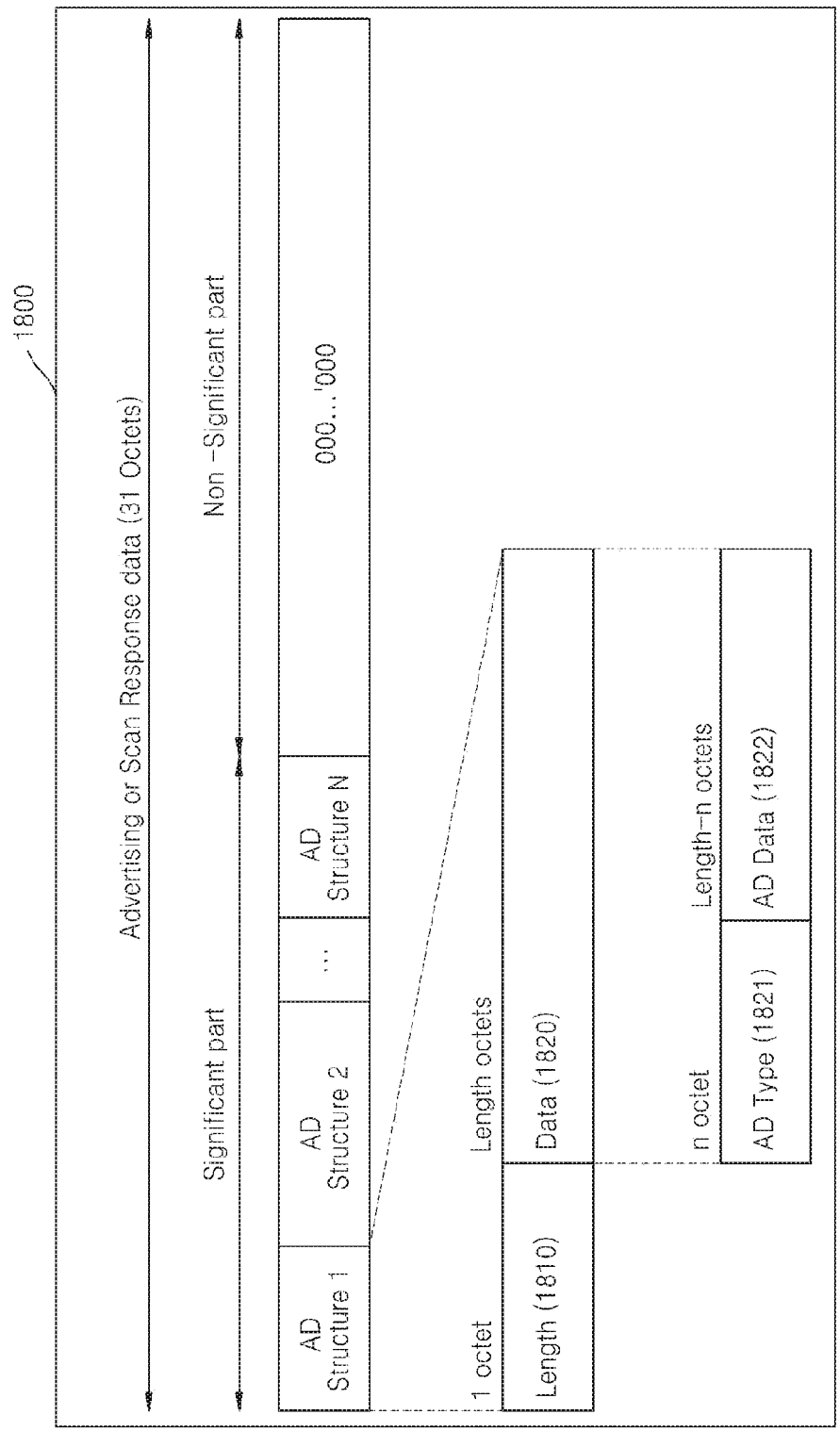
FIG. 18 is a diagram illustrating a data format of an advertising packet broadcasted by a BLE device, according to an embodiment of the present disclosure.

FIG. 18 is a diagram illustrating a data format 1800 of an advertising packet broadcasted by a BLE device, according to an embodiment of the present disclosure.

The data format 1800 of FIG. 18 shows a payload excluding a header of the advertising packet broadcasted by the BLE device 200. Advertising Data (AD) included in the payload of the advertising packet according to an embodiment of the present disclosure may be composed of 31 octets (Bytes).

Meanwhile, a plurality of AD structures may be included in the payload of the advertising packet according to an embodiment of the present disclosure, and each may include a length part 1810 and a data part 1820. Information regarding a length of the data part 1820 may be included in the length part 1810. Substantial data that is to be broadcasted by the BLE device 200 may be included in the data part 1820.

In this regard, according to an embodiment of the present disclosure, the data part 1820 may include an AD type 1821 and AD data 1822. A value for identifying a type of the AD data 1822 may be included in the AD type 1821. The AD type 1821 will now be described in more detail with reference to FIG. 19.

FIG. 19 is a table for explaining an AD type, according to an embodiment of the present disclosure.

Referring to FIG. 19, the AD type 1920 that may be included in an advertising data packet may be diverse. For example, the AD type 1920 may include <<Flags>>, <<Incomplete List of 16-bit Service Class UUIDs>>, <<Complete List of 16-bit Service Class UUIDs>>, <<Incomplete List of 32-bit Service Class UUIDs>>, <<Complete List of 32-bit Service Class UUIDs>>, <<Incomplete List of 128-bit Service Class UUIDs>>, <<Complete List of 128-bit Service Class UUIDs>>, <<Shortened Local Name>>, <<Complete Local Name>>, <<TX Power Level>>, <<Class of Device>>, <<Simple Pairing Hash C>>, <<Simple Pairing Randomizer R>>, <<Device ID>>, <<Security Manager TK Value>>, <<Security Manager Out of Band Flags>>, <<Slave Connection Interval Range>>, <<List of 16-bit Service Solicitation UUIDs>>, <<List of 128-bit Service Solicitation UUIDs>>, <<Service Data>>, <<Public Target Address>>, <<Random Target Address>>, <<Appearance>>, <<Manufacturer Specific Data>>, and the like.

Meanwhile, the AD type 1920 may be expressed as a previously set value 1910 that may be included in the advertising data packet in such a way that a scanner (for example, the mobile terminal 100) may identify the AD type 1920. Meanwhile, one of ordinary skill in the art may obviously identify a definition 1930 of the AD type 1920 from a table of FIG. 19, and thus a detailed description of the definition 1930 of the AD type 1920 will be omitted here.

FIGS. 20A and 20B are a table for explaining data broadcasted by a BLE device, according to an embodiment of the present disclosure.

Referring to FIGS. 20A and 20B, the BLE device 200 may broadcast necessary data by using a specific AD type. For example, in a case where the BLE device 200 is a smart phone manufactured by Samsung Electronics Co., Ltd., the BLE device 200 may include and broadcast TX Power Level (e.g., +4 dBm), Shortened Local Name (e.g., GT-N8000, Samsung Mobile), Class of Device (e.g., Major: Phone, Minor: Smart phone, Service: Object Transfer), Random Target Address (e.g., Samsung Mobile), List of Service Solicitation (e.g., 0X1105), Manufacturer Specific Data<<Protocol>> (e.g., 0X0075: a previously defined code indicating Samsung Electronics), Manufacturer Specific Data<<Capability>> (e.g., OX00ff: Bluetooth BR/EDR, Bluetooth AMP, Bluetooth LE, WiFi, WiFi Direct, WiFi Display, DLSN(All-share), NFC, RFID support), Manufacturer Specific Data<<Sensor>> (e.g., 0X06000024: Temperature 36° C.), and Manufacturer Specific Data<<Others>> (e.g., Silent mode, Screen Rotation, Power Saving, Notification, Mobile Data, Driving mode, Sync mode, Privacy/Flight mode, etc. which indicate a current status of the BLE device 200) in an advertising data packet.

In this regard, since a length of AD is limited to 31 bytes, the BLE device 200 may broadcast only essential data by using an advertising data packet and additionally respond to optional data such as Local Name through SCAN_RSP. Also, the advertising data packet according to an embodiment of the present disclosure may further include an encryption field.

Meanwhile, the BLE device 200 according to an embodiment of the present disclosure may broadcast property information (for example, information regarding a sensor included in the BLE device 200 or appearance color information of the BLE device 200) through the advertising data packet.

For example, in a case where the BLE device 200 is a blue tag including a temperature sensor, the BLE device 200 may include identification information (for example, "SAMSUNG_ Temp_TAG001_blue") indicating property information in a UUID field or an MSD field thereof and may broadcast the identification information to the outside.

According to another embodiment of the present disclosure, the BLE device 200 may include and broadcast sensing information measured by a sensor in an MSD field. For example, in a case where the BLE device 200 includes the temperature sensor and a current temperature measured by the temperature sensor is 36° C., the BLE device 200 may include a code ("0X06000024") indicating that the temperature is 36° C. in the MSD <Sensor> field and may broadcast the code.

Meanwhile, the BLE device 200 according to an embodiment of the present disclosure may use a random device address, instead of a Bluetooth device address BD_ADDR or a MAC address, for privacy. Also, the BLE device 200 according to an embodiment of the present disclosure may have been previously included in a White/Black list before broadcasting the advertising packet and may disregard a connect request sent by an apparatus of an address that is not allowed. Also, the BLE device 200 may additionally perform an authentication operation on a scanner (for example, the mobile terminal 100) through an internal and external server and reinforce security. To the contrary, the mobile terminal 100 may perform the authentication operation on the BLE device 200 through the internal and external server.

Meanwhile, the BLE device 200 according to an embodiment of the present disclosure may adjust an advertising interval according to a state of the BLE device 200 such as stop, or move (walking or moving by vehicle, etc.) and increase connectivity to the mobile terminal 100. For example, the BLE device 200 may lengthen the advertising interval in a sleep mode and shorten the advertising interval while moving.

Also, the BLE device 200 according to an embodiment of the present disclosure may adjust a transmission (TX) power level for each status. For example, in a case where the BLE device 200 broadcasts data requiring security, the BLE device 200 may reduce the transmission (TX) power level.

Figure 21:
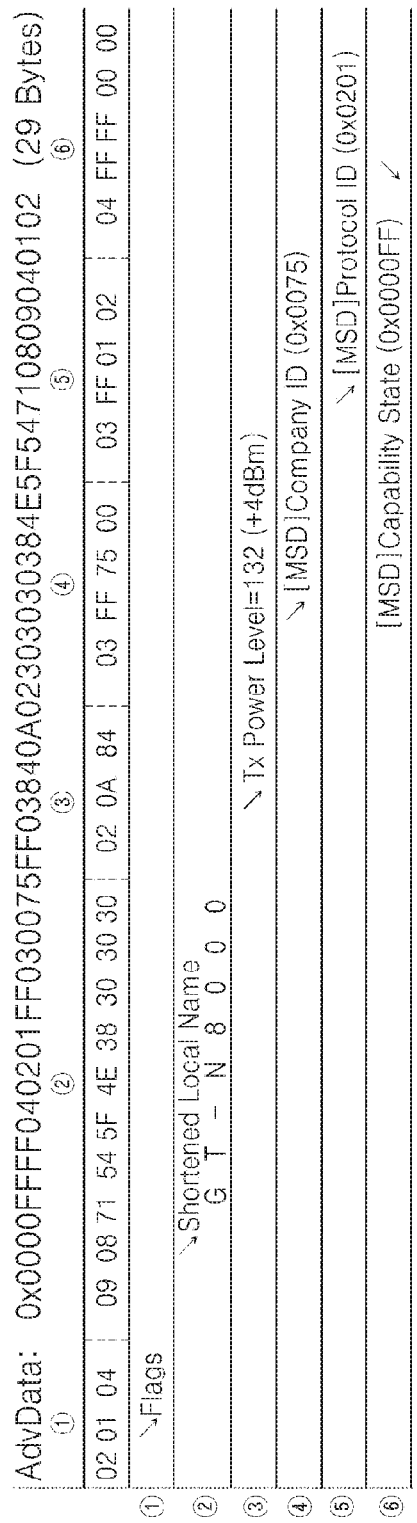
FIG. 21 is a diagram illustrating an example of an AD packet according to an embodiment of the present disclosure.

FIG. 21 is a diagram illustrating an example of an AD packet according to an embodiment of the present disclosure.

Referring to FIG. 21, the total length of AD is 29 bytes. If AD "0X0000FFFF040201FF030075FF03840A02303030384E 5F54710809040102" is analyzed from the back thereof, the AD of 29 bytes may be divided into 6 AD structures.

In a first AD structure (①), "02" indicates a length (2 bytes) of an AD type and AD data, "01" indicates an AD type (Flags), and "04" indicates substantial data (LE and BR/EDR simultaneous availability (Host)).

In a second AD Structure (②), '09' indicates a length (9 bytes) of the AD type and the AD data, '08' indicates an AD type (Shortened Local Name), and '71 54 5F 4E 38 30 30 30' indicates substantial data (G T-N 8 0 0 0).

In a third AD Structure (③), '02' indicates a length (2 bytes) of the AD type and the AD data, '0A' indicates an AD type (Tx Power Level), and '84' indicates substantial data (132(+4 dBm)).

In a fourth AD Structure (④), '03' indicates a length (3 bytes) of the AD type and the AD data, 'FF' indicates an AD type (Manufacturer Specific Data), and '75 00' indicates substantial data (Company ID: 0X0075=Samsung Electronics).

In a fifth AD Structure (⑤), '03' indicates a length (3 bytes) of the AD type and the AD data, 'FF' indicates an AD type (Manufacturer Specific Data), and '01 02' indicates substantial data (Protocol ID: 0X0201).

In a sixth AD Structure (⑥), '04' indicates a length (4 bytes) of the AD type and the AD data, 'FF' indicates an AD type (Manufacturer Specific Data), and 'FF 00 00' indicates substantial data (Capability state: 0X0000FF=Bluetooth BR/EDR, Bluetooth AMP, Bluetooth LE, WiFi, WiFi Direct, WiFi Display, DLSN(All-share), NFC, RFID support).

While the present disclosure has been shown and described with reference to various embodiments thereof, it will be understood by those skilled in the art that various changes in form and details may be made therein without departing from the spirit and scope of the present disclosure as defined by the following claims and their equivalents.

What is claimed is:

1. A method of controlling screen lock of a mobile terminal, the method comprising:
   receiving an input corresponding to an operation of turning on a display of the mobile terminal;
   detecting a wireless device within a predefined range from the mobile terminal;
   obtaining information of the detected wireless device;
   determining whether the obtained information matches information stored in the mobile terminal;
   displaying, if the obtained information matches the information stored in the mobile terminal, a home screen on the display;
   displaying, if the obtained information mismatches the information stored in the mobile terminal, an unlock requesting screen on the display;
   acquiring, after the display is turned on, if the detected wireless device having the obtained information being matched to the information stored in the mobile terminal is continuously detected, a first sensing information from the detected wireless device; and
   controlling display of a screen on the display based on a matching result of the first sensing information and a predefined sensing condition,
   wherein the predefined sensing condition comprises at least one of a sensing condition for a motion of the wireless device and a sensing condition for an input gesture of the wireless device.

2. The method of claim 1, further comprising, if, after the display is turned on, the wireless device having the obtained information being matched to the information stored in the mobile terminal is continuously detected, controlling to keep the display on without displaying the unlock requesting screen until a screen off input is received from a user.

3. The method of claim 2, further comprising, if the obtained information is not received from the wireless device for a predefined period of time while the display is on, controlling to turn off the display.

4. The method of claim 1, wherein the wireless device comprises a Bluetooth Low Energy (BLE) device.

5. The method of claim 1, further comprising, before the displaying the home screen, acquiring a second sensing information from the mobile terminal,
   wherein the displaying the home screen comprises:
      if the obtained information matches the information stored in the mobile terminal and the acquired second sensing information satisfies the predefined sensing condition associated with the mobile terminal, displaying the home screen on the display.

6. The method of claim 5, wherein the acquiring of the second sensing information is carried out if the wireless device is detected by the mobile terminal.

7. The method of claim 5, wherein the predefined sensing condition comprises a sensing condition that motion of the mobile terminal is identical to a predefined motion shape.

8. The method of claim 5, wherein the predefined sensing condition comprises a sensing condition that a face of a user recognized by the mobile terminal corresponds to a predefined face.

9. The method of claim 5, further comprising:
   after the display is turned on, if the wireless device having the obtained information being matched to the information stored in the mobile terminal is continuously detected, acquiring new sensing information from the mobile terminal; and if the new sensing information satisfies the predefined sensing condition, controlling to keep the display on until a screen off input is received from a user of the mobile terminal.

10. The method of claim 1, further comprising, before the displaying the home screen, receiving the first sensing information from the wireless device,
wherein the displaying the home screen comprises:
if the obtained information matches the information stored in the mobile terminal and the received first sensing information satisfies the predefined sensing condition associated with the wireless device, displaying the home screen on the display.

11. A mobile terminal which controls screen lock, the mobile terminal comprising:
a display;
a User Interface (UI) device configured to receive an input corresponding to an operation of turning on the display;
a memory configured to store information;
a transceiver configured to detect a wireless device within a predefined range from the mobile terminal and obtain information of the wireless device; and
at least one processor configured to:
determine whether the obtained information matches the information stored in the memory,
display a home screen on the display if the obtained information matches the information stored in the memory, and
display an unlock requesting screen on the display if the obtained information mismatches the information stored in the memory; and
a sensor configured to acquire a sensing information, after the display is turned on, if the wireless device having the obtained information being matched to the information stored in the mobile terminal is continuously detected,
wherein the sensor further configured to acquire a first sensing information from the detected wireless device,
wherein the at least one processor further configured to control display of a screen on the display based on a matching result of the first sensing information and a predefined sensing condition, and
wherein the predefined sensing condition comprises at least one of a sensing condition for a motion of the wireless device and a sensing condition for an input gesture of the wireless device.

12. The mobile terminal of claim 11, wherein, if, after the display is turned on, the wireless device having the obtained information being matched to the information stored in the memory is continuously detected, the at least one processor is further configured to control to keep the display on without displaying the unlock requesting screen until a screen off input is received from a user.

13. The mobile terminal of claim 12, wherein, if the obtained information is not received from the wireless device for a predefined period of time while the display is on, the at least one processor is further configured to control to turn off the display.

14. The mobile terminal of claim 11, wherein the wireless device comprises a Bluetooth Low Energy (BLE) device.

15. The mobile terminal of claim 11, wherein the memory is further configured to store a predefined distance between the wireless device and the mobile terminal, and
wherein the transceiver is further configured to detect the wireless device transmitting a signal having an intensity equal to or greater than a reception signal intensity corresponding to the predefined distance.

16. The mobile terminal of claim 11, further comprising:
wherein the sensor is further configured to acquire a second sensing information from the mobile terminal,
wherein the memory is further configured to store the predefined sensing condition associated with the mobile terminal, and
wherein the at least one processor is further configured to display the home screen on the display if the obtained information matches the information stored in the memory and the acquired second sensing information satisfies the predefined sensing condition.

17. The mobile terminal of claim 16, wherein the sensor is further configured to acquire the second sensing information if the wireless device is detected by the mobile terminal.

18. The mobile terminal of claim 16, wherein, after the display is turned on, if the wireless device having the obtained information being matched to the information stored in the mobile terminal is continuously detected, the sensor is further configured to acquire new sensing information, and
wherein, if the new sensing information satisfies the predefined sensing condition, the at least one processor is further configured to control to keep the display on until a screen off input is received from a user of the mobile terminal.

19. The mobile terminal of claim 11, wherein the memory is further configured to store the predefined sensing condition associated with the wireless device,
wherein the transceiver is further configured to receive the first sensing information from the wireless device, and
wherein the at least one processor is further configured to display the home screen on the display if the obtained information matches the information stored in the memory and the received first sensing information satisfies the predefined sensing condition.

20. A non-transitory computer readable recording medium having recorded thereon a program to execute a method of controlling screen lock of a mobile terminal, the method comprising:
receiving an input corresponding to an operation of turning on a display of the mobile terminal;
detecting a wireless device within a predefined range from the mobile terminal;
obtaining information of the detected wireless device;
determining whether the obtained information matches information stored in the mobile terminal;
displaying, if the obtained information matches the information stored in the mobile terminal, a home screen on the display;
displaying, if the obtained information mismatches the information stored in the mobile terminal, an unlock requesting screen on the display;
acquiring, after the display is turned on, if the detected wireless device having the obtained information being matched to the information stored in the mobile terminal is continuously detected, a first sensing information from the detected wireless device; and
controlling display of a screen on the display based on a matching result of the first sensing information and a predefined sensing condition,
wherein the predefined sensing condition comprises at least one of a sensing condition for a motion of the wireless device and a sensing condition for an input gesture of the wireless device.

* * * * *